United States Patent
Lu et al.

(10) Patent No.: US 10,985,368 B2
(45) Date of Patent: Apr. 20, 2021

(54) REGENERATIVE POLYSULFIDE-SCAVENGING LAYERS ENABLING LITHIUM-SULFUR BATTERIES WITH HIGH ENERGY DENSITY AND PROLONGED CYCLING LIFE AND METHODS OF MAKING SAME

(71) Applicants: The Regents of the University of California, Oakland, CA (US); Ford Cheer International Limited, Tortola (VG)

(72) Inventors: Yunfeng Lu, Culver City, CA (US); Jimmy Wang, Monrovia, CA (US); Li Shen, Los Angeles, CA (US)

(73) Assignees: THE REGENTS OF THE UNIVERSITY OF CALIFORNIA, Oakland, CA (US); FORD CHEER INTERNATIONAL LIMITED, Tortola (VG)

( * ) Notice: Subject to any disclaimer, the term of this patent is extended or adjusted under 35 U.S.C. 154(b) by 215 days.

(21) Appl. No.: 15/889,603

(22) Filed: Feb. 6, 2018

(65) Prior Publication Data
US 2018/0241039 A1 Aug. 23, 2018

Related U.S. Application Data

(60) Provisional application No. 62/456,936, filed on Feb. 9, 2017.

(51) Int. Cl.
| | |
|---|---|
| H01M 4/58 | (2010.01) |
| H01M 4/76 | (2006.01) |
| H01M 4/75 | (2006.01) |
| H01M 10/052 | (2010.01) |
| H01M 10/42 | (2006.01) |
| H01M 4/38 | (2006.01) |
| H01M 4/66 | (2006.01) |
| H01M 4/62 | (2006.01) |
| H01M 4/70 | (2006.01) |
| H01M 2/16 | (2006.01) |

(52) U.S. Cl.
CPC ....... *H01M 4/5815* (2013.01); *H01M 2/1653* (2013.01); *H01M 4/38* (2013.01); *H01M 4/382* (2013.01); *H01M 4/623* (2013.01); *H01M 4/625* (2013.01); *H01M 4/661* (2013.01); *H01M 4/663* (2013.01); *H01M 4/667* (2013.01); *H01M 4/70* (2013.01); *H01M 4/75* (2013.01); *H01M 4/762* (2013.01); *H01M 10/052* (2013.01); *H01M 10/4242* (2013.01); *H01M 2300/0094* (2013.01)

(58) Field of Classification Search
CPC ........... H01M 4/5815; H01M 10/4242; H01M 2300/0094
See application file for complete search history.

(56) References Cited

U.S. PATENT DOCUMENTS

| | | | |
|---|---|---|---|
| 8,236,446 | B2 | 8/2012 | Lu |
| 9,564,656 | B1 | 2/2017 | Zhamu et al. |
| 2011/0235240 | A1 | 9/2011 | Lu et al. |
| 2012/0207994 | A1 | 8/2012 | Wang et al. |
| 2015/0056493 | A1 | 2/2015 | Dadheech et al. |

FOREIGN PATENT DOCUMENTS

CN 102263257 B 8/2013

OTHER PUBLICATIONS

Li et al., "Controlling the Formation of Rodlike V2O5 Nanocrystals on Reduced Graphene Oxide for High-Performance Supercapacitors", Appl. Mater. Interfaces, vol. 5, 11462-11470, 2013.*
Zhuang et al., "Rational Integration of Polypropylene/Graphene Oxide/Nafion as Ternary-Layered Separator to Retard the Shuttle of Polysulfides for Lithium-Sulfur Batteries", small, vol. 12, No. 3, 381-389, 2016.*
Korean Intellectual Property Office (ISA/KR), "International Search Report for PCT/US2018/017155", Korea, dated May 18, 2018.
Carter et al., "Polysulfide Anchoring Mechanism Revealed by Atomic Layer Deposition of V2O5 and Sulfur-Filled Carbon Nanotubes for Lithium-Sulfur Batteries", Applied Materials & Interfaces, vol. 9, 2017, pp. 7185-7192.
Jia et al., "Carbon nanotube-penetrated mesoporous V2O5 microspheres as high-performance cathode materials for lithium-ion batteries", RSC Advances, vol. 4, 2014, pp. 21018-21022.
EPO, "Supplementary European Search Report for EP No. 18 75 1931", Munich, Germany, dated Oct. 23, 2020.
Jampani, Prashanth H. et al., "High energy density titanium dope-vanadium oxide-vertically aligned CNT composite electrodes for supercapacitor applications", Journal of Materials Chemistry A, vol. 3, No. 16, 2015, pp. 8413-8432.
Manthiram, A.; Fu, Y.; Chung, S.-H.; Zu, C.; Su, Y.-S. Rechargeable Lithium-Sulfur Batteries. Chem. Rev. 2014, 114, 11751-11787.
Yang, Y.; Zheng, G.; Cui, Y. Nanostructured Sulfur Cathodes. Chem. Soc. Rev. 2013, 42, 3018-3032.
Mikhaylik, Y. V.; Akridge, J. R. Polysulfide Shuttle Study in the Li/S Battery System. J. Electrochem. Soc. 2004, 151, A1969.
Ji, X.; Lee, K. T.; Nazar, L. F. A Highly Ordered Nanostructured Carbon-Sulphur Cathode for Lithium-Sulphur Batteries. Nat. Mater. 2009, 8, 500-506.

(Continued)

*Primary Examiner* — Ladan Mohaddes
(74) *Attorney, Agent, or Firm* — Locke Lord LLP; Tim Tingkang Xia, Esq.

(57) ABSTRACT

The invention relates to a method for fabricating a regenerative polysulfide-scavenging layer (RSL). The method includes embedding nanowires or nanocrystals of metal oxides with a membrane of carbon nanotubes (CNTs); and forming the RSL with the embedded nanowires or nanocrystals of the metal oxides and the membrane, so as to enable lithium-sulfur batteries with high energy density and prolonged cycling life. The invention also relates to a lithium-sulfur battery that contains the RSL.

7 Claims, 25 Drawing Sheets

(56) References Cited

OTHER PUBLICATIONS

Elazari, R.; Salitra, G.; Garsuch, A.; Panchenko, A.; Aurbach, D. Sulfur-Impregnated Activated Carbon Fiber Cloth as a Binder-Free Cathode for Rechargeable Li-S Batteries. Adv. Mater. 2011, 23, 5641-5644.
Zhou, G.; Paek, E.; Hwang, G. S.; Manthiram, A. Long-Life Li/polysulphide Batteries with High Sulphur Loading Enabled by Lightweight Three-Dimensional Nitrogen/sulphur-Codoped Graphene Sponge. Nat. Commun. 2015, 6, 7760.
Ji, X.; Evers, S.; Black, R.; Nazar, L. F. Stabilizing Lithium-Sulphur Cathodes Using Polysulphide Reservoirs. Nat. Commun. 2011, 2, 325.
Wei Seh, Z.; Li, W.; Cha, J. J.; Zheng, G.; Yang, Y.; McDowell, M. T.; Hsu, P.-C.; Cui, Y. Sulphur-TiO2 Yolk-Shell Nanoarchitecture with Internal Void Space for Long-Cycle Lithium-Sulphur Batteries. Nat. Commun. 2013, 4, 1331.
Chung, W. J.; Griebel, J. J.; Kim, E. T.; Yoon, H.; Simmonds, A. G.; Ji, H. J.; Dirlam, P. T.; Glass, R. S.; Wie, J. J.; Nguyen, N. A.; et al. The Use of Elemental Sulfur as an Alternative Feedstock for Polymeric Materials. Nat. Chem. 2013, 5, 518-524.
Ma, L.; Zhuang, H. L.; Wei, S.; Hendrickson, K. E.; Kim, M. S.; Cohn, G.; Hennig, R. G.; Archer, L. A. Enhanced Li-S Batteries Using Amine-Functionalized Carbon Nanotubes in the Cathode. ACS Nano 2016, 10, 1050-1059.
Yan, N.; Yang, X.; Zhou, W.; Zhang, H.; Li, X.; Zhang, H. Fabrication of a Nano-Li-Channel Interlayer for High Performance Li—S Battery Application. RSC Adv. 2015, 5, 26273-26280.
Huang, J.-Q.; Zhang, Q.; Peng, H.-J.; Liu, X.-Y.; Qian, W.-Z.; Wei, F. Ionic Shield for Polysulfides towards Highly-Stable Lithium-sulfur Batteries. Energy Environ. Sci. 2014, 7, 347-353.
Jin, Z.; Xie, K.; Hong, X. Electrochemical Performance of Lithium/sulfur Batteries Using Perfluorinated Ionomer Electrolyte with Lithium Sulfonyl Dicyanomethide functional Groups as Functional Separator. RSC Adv. 2013, 3, 8889.
Li, W.; Hicks-Garner, J.; Wang, J.; Liu, J.; Gross, A. F.; Sherman, E.; Graetz, J.; Vajo, J. J.; Liu, P. V2O5 Polysulfide Anion Barrier for Long-Lived Li-S Batteries. Chem. Mater. 2014, 26, 3403-3410.
Su, Y.-S.; Manthiram, A. A New Approach to Improve Cycle Performance of Rechargeable Lithium-Sulfur Batteries by Inserting a Free-Standing MWCNT Interlayer. Chem. Commun. 2012, 48, 8817-8819.
Chung, S.-H.; Manthiram, A. High-Performance Li-S Batteries with an Ultra-Lightweight MWCNT-Coated Separator. J. Phys. Chem. Lett. 2014, 5, 1978-1983.
Wang, G.; Lai, Y.; Zhang, Z.; Li, J.; Zhang, Z. Enhanced Rate Capability and Cycle Stability of Lithium-sulfur Batteries with a Bifunctional MCNT@PEG-Modified Separator. J. Mater. Chem. A 2015, 3, 7139-7144.
Kim, H. M.; Hwang, J.-Y.; Manthiram, A.; Sun, Y.-K. High-Performance Lithium-Sulfur Batteries with a Self-Assembled Multiwall Carbon Nanotube Interlayer and a Robust Electrode-Electrolyte Interface. ACS Appl. Mater. Interfaces 2016, 8, 983-987.
Chang, C.-H.; Chung, S.-H.; Manthiram, A. Effective Stabilization of a High-Loading Sulfur Cathode and a Lithium-Metal Anode in Li-S Batteries Utilizing SWCNT-Modulated Separators. Small 2016, 12, 174-179.
Kim, M. S.; Ma, L.; Choudhury, S.; Archer, L. A. Multifunctional Separator Coatings for High-Performance Lithium-Sulfur Batteries. Adv. Mater. Interfaces 2016, 3, 1600450.
Vizintin, A.; Lozinšek, M.; Chellappan, R. K.; Foix, D.; Krajnc, A.; Mali, G.; Orazic, G.; Genorio, B.; Dedryvère, R.; Dominko, R. Fluorinated Reduced Graphene Oxide as an Interlayer in Li-S Batteries. Chem. Mater. 2015, 27, 7070-7081.
Huang, J.-Q.; Zhuang, T.-Z.; Zhang, Q.; Peng, H.-J.; Chen, C.-M.; Wei, F. Permselective Graphene Oxide Membrane for Highly Stable and Anti-Self-Discharge Lithium-Sulfur Batteries. ACS Nano 2015, 9, 3002-3011.

Zu, C.; Su, Y.-S.; Fu, Y.; Manthiram, A. Improved Lithium-Sulfur Cells with a Treated Carbon Paper Interlayer. Phys. Chem. Chem. Phys. 2013, 15, 2291-2297.
Yao, H.; Yan, K.; Li, W.; Zheng, G.; Kong, D.; Seh, Z. W.; Narasimhan, V. K.; Liang, Z.; Cui, Y. Improved Lithium-sulfur Batteries with a Conductive Coating on the Separator to Prevent the Accumulation of Inactive S-Related Species at the Cathode—separator Interface. Energy Environ. Sci. 2014, 7, 3381-3390.
Chung, S.-H.; Manthiram, A. Bifunctional Separator with a Light-Weight Carbon-Coating for Dynamically and Statically Stable Lithium-Sulfur Batteries. Adv. Funct. Mater. 2014, 24, 5299-5306.
Singhal, R.; Chung, S.-H.; Manthiram, A.; Kalra, V. A Free-Standing Carbon Nanofiber Interlayer for High-Performance Lithium-sulfur Batteries. J. Mater. Chem. A 2015, 3, 4530-4538.
Balach, J.; Jaumann, T.; Klose, M.; Oswald, S.; Eckert, J.; Giebeler, L. Functional Mesoporous Carbon-Coated Separator for Long-Life, High-Energy Lithium-Sulfur Batteries. Adv. Funct. Mater. 2015, 25, 5285-5291.
Chung, S.-H.; Han, P.; Singhal, R.; Kalra, V.; Manthiram, A. Electrochemically Stable Rechargeable Lithium-Sulfur Batteries with a Microporous Carbon Nanofiber filter for Polysulfide. Adv. Energy Mater. 2015, 5, 1500738.
Chung, S.-H.; Manthiram, A. A Polyethylene Glycol-Supported Microporous Carbon Coating as a Polysulfide Trap for Utilizing Pure Sulfur Cathodes in Lithium-Sulfur Batteries. Adv. Mater. 2014, 26, 7352-7357.
Su, Y.-S.; Manthiram, A. Lithium-Sulphur Batteries with a Microporous Carbon Paper as a Bifunctional Interlayer. Nat. Commun. 2012, 3, 1166.
Song, R.; Fang, R.; Wen, L.; Shi, Y.; Wang, S.; Li, F. A Trilayer Separator with Dual Function for High Performance Lithium-sulfur Batteries. J. Power Sources 2016, 301, 179-186.
Xiao, Z.; Yang, Z.; Wang, L.; Nie, H.; Zhong, M.; Lai, Q.; Xu, X.; Zhang, L.; Huang, S. A Lightweight TiO2/Graphene Interlayer, Applied as a Highly Effective Polysulfide Absorbent for Fast, Long-Life Lithium-Sulfur Batteries. Adv. Mater. 2015, 27, 2891-2898.
Kim, M. S.; Ma, L.; Choudhury, S.; Moganty, S. S.; Wei, S.; Archer, L. A. Fabricating Multifunctional Nanoparticle Membranes by a Fast Layer-by-Layer Langmuir-Blodgett Process: Application in Lithium-sulfur Batteries. J. Mater. Chem. A 2016, 4, 14709-14719.
Hagen, M.; Hanselmann, D.; Ahlbrecht, K.; Maça, R.; Gerber, D.; Tübke, J. Lithium-Sulfur Cells: The Gap between the State-of-the-Art and the Requirements for High Energy Battery Cells. Adv. Energy Mater. 2015, 5, 1401986.
Li, G.; Qiu, Y.; Hou, Y.; Li, H.; Zhou, L.; Deng, H.; Zhang, Y. Synthesis of V2O5 Hierarchical Structures for Long Cycle-Life Lithium-Ion Storage. J. Mater. Chem. A 2015, 3, 1103-1109.
Lee, J. W.; Lim, S. Y.; Jeong, H. M.; Hwang, T. H.; Kang, J. K.; Choi, J. W. Extremely Stable Cycling of Ultra-Thin V2O5 Nanowire—graphene Electrodes for Lithium Rechargeable Battery Cathodes. Energy Environ. Sci. 2012, 5, 9889.
Chen, Z.; Qin, Y.; Weng, D.; Xiao, Q.; Peng, Y.; Wang, X.; Li, H.; Wei, F.; Lu, Y. Design and Synthesis of Hierarchical Nanowire Composites for Electrochemical Energy Storage. Adv. Funct. Mater. 2009, 19, 3420-3426.
Petkov, V.; Trikalitis, P. N.; Bozin, E. S.; Billinge, S. J. L.; Vogt, T.; Kanatzidis, M. G. Structure of V2O5•nH2O Xerogel Solved by the Atomic Pair Distribution function Technique. J. Am. Chem. Soc. 2002, 124, 10157-10162.
Xiong, C.; Aliev, A. E.; Gnade, B.; Balkus, K. J. Fabrication of Silver Vanadium Oxide and V2O5 Nanowires for Electrochromics. ACS Nano 2008, 2, 293-301.
Zhang, S. S. Liquid Electrolyte Lithium/sulfur Battery: Fundamental Chemistry, Problems, and Solutions. J. Power Sources 2013, 231, 153-162.
Hart, C. J.; Cuisinier, M.; Liang, X.; Kundu, D.; Garsuch, A.; Nazar, L. F. Rational Design of Sulphur Host Materials for Li-S Batteries: Correlating Lithium Polysulphide Adsorptivity and Self-Discharge Capacity Loss. Chem. Commun. 2015, 51, 2308-2311.
Mendialdua, J.; Casanova, R.; Barbaux, Y. XPS Studies of V2O5, V6O13, VO2 and V2O3. J. Electron. Spectros. Relat. Phenomena 1995, 71, 249-261.

(56) References Cited

OTHER PUBLICATIONS

Liang, X.; Hart, C.; Pang, Q.; Garsuch, A.; Weiss, T.; Nazar, L. F. A Highly Efficient Polysulfide Mediator for Lithium-Sulfur Batteries. Nat. Commun. 2015, 6, 5682.

Tao, X.; Wang, J.; Ying, Z.; Cai, Q.; Zheng, G.; Gan, Y.; Huang, H.; Xia, Y.; Liang, C.; Zhang, W.; et al. Strong Sulfur Binding with Conducting Magnéli-Phase $TinO2(n-1)$ Nanomaterials for Improving Lithium-Sulfur Batteries. Nano Lett. 2014, 14, 5288-5294.

Greiner, M. T.; Helander, M. G.; Tang, W.-M.; Wang, Z.-B.; Qiu, J.; Lu, Z.-H. Universal Energy-Level Alignment of Molecules on Metal Oxides. Nat. Mater. 2012, 11, 76-81.

Xu, Y.; Schoonen, M. A. A. the Absolute Energy Positions of Conduction and Valence Bands of Selected Semiconducting Minerals. Am. Mineral. 2000, 85, 543-556.

Matar, S. F.; Campet, G.; Subramanian, M. A. Electronic Properties of Oxides: Chemical and Theoretical Approaches. Prog. in Solid State Chem. 2011, 39, 70-95.

Greiner, M. T.; Chai, L.; Helander, M. G.; Tang, W.-M.; Lu, Z.-H. Transition Metal Oxide Work Functions: The Influence of Cation Oxidation State and Oxygen Vacancies. Adv. Funct. Mater. 2012, 22, 4557-4568.

Hiemenz, P.C., Rajagopalan, R. Principles of Colloid and Surface Chemistry. In the Electrical Double Layer and Double-Layer Interactions; Marcel Dekker, New York, 1997; pp. 509-510.

Dean, J. A. Lange's Handbook of Chemistry. In Properties of Atoms, Radicals, and Bonds; McGraw-Hill, New York, 1999; pp. 599-611.

Masel, R. I. Principles of Adsorption and Reaction on Solid Surfaces. In Adsorption l: The Binding of Molecules to Surfaces; John Wiley & Sons, New Jersey, 1996; pp. 138-139.

Ma, Y.; Zhang, H.; Wu, B.; Wang, M.; Li, X.; Zhang, H. Lithium Sulfur Primary Battery with Super High Energy Density: Based on the Cauliflower-like Structured C/S Cathode. Sci. Rep. 2015, 5, 14949.

Wang, X.; Wang, Z.; Chen, L. Reduced Graphene Oxide Film as a Shuttle-Inhibiting Interlayer in a Lithium-sulfur Battery. J. Power Sources 2013, 242, 65-69.

Zhang, Y.; Miao, L.; Ning, J.; Xiao, Z.; Hao, L.; Wang, B.; Zhi, L. A Graphene-Oxide-Based Thin Coating on the Separator: An Efficient Barrier towards High-Stable Lithium-sulfur Batteries. 2D Mater. 2015, 2, 024013.

Chang, C.-H.; Chung, S.-H.; Manthiram, A. Ultra-Lightweight PANiNF/MWCNT-functionalized Separators with Synergistic Suppression of Polysulfide Migration for Li-S Batteries with Pure Sulfur Cathodes. J. Mater. Chem. A 2015, 3, 18829-18834.

Lin, W.; Chen, Y.; Li, P.; He, J.; Zhao, Y.; Wang, Z.; Liu, J.; Qi, F.; Zheng, B.; Zhou, J.; Xu, C.; Fu, F. Enhanced Performance of Lithium Sulfur Battery with a Reduced Graphene Oxide Coating Separator. J. Electrochem. Soc. 2015, 162, A1624-A1629.

Lee, C.-L.; Kim, I.-D. A Hierarchical Carbon Nanotube-Loaded Glass-Filter Composite Paper Interlayer with Outstanding Electrolyte Uptake Properties for High-Performance Lithium-Sulphur Batteries. Nanoscale 2015, 7, 10362-10367.

\* cited by examiner (A) as-prepared  FIG. 10A
(B) folded  FIG. 10B
(C) recovered states  FIG. 10C

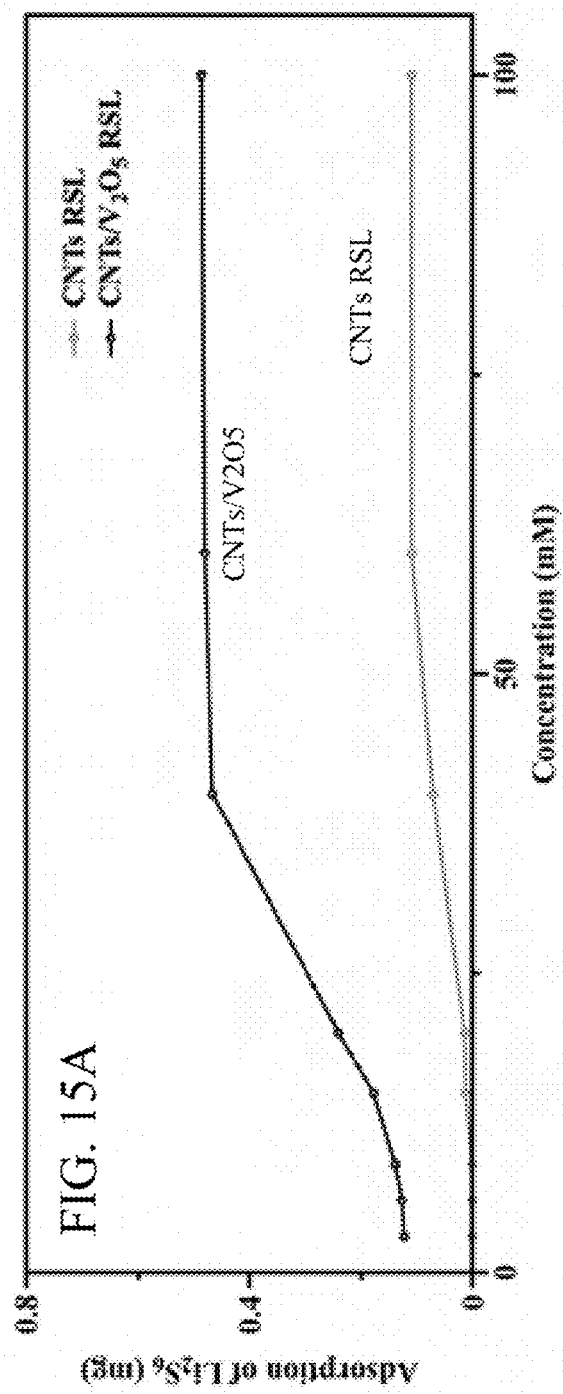
FIG. 15A
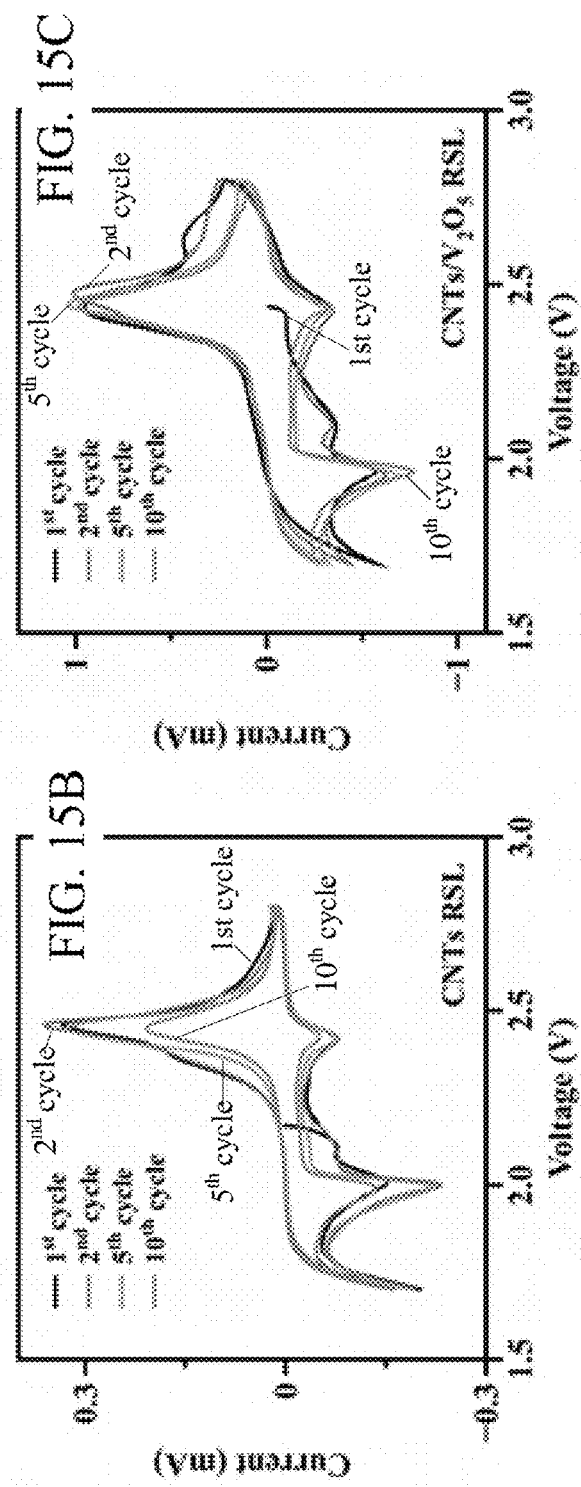
FIG. 15B
FIG. 15C

REGENERATIVE POLYSULFIDE-SCAVENGING LAYERS ENABLING LITHIUM-SULFUR BATTERIES WITH HIGH ENERGY DENSITY AND PROLONGED CYCLING LIFE AND METHODS OF MAKING SAME

CROSS-REFERENCE TO RELATED PATENT APPLICATION

The present application claims priority to and the benefit of U.S. Provisional Patent Application Ser. No. 62/456,936, filed Feb. 9, 2017, entitled "REGENERATIVE POLYSULFIDE-SCAVENGING LAYERS ENABLING LITHIUM-SULFUR BATTERIES WITH HIGH ENERGY DENSITY AND PROLONGED CYCLING LIFE AND METHODS OF MAKING SAME," by Yunfeng Lu et al. The entire disclosure of the above-identified application is incorporated herein by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, [n] represents the nth reference cited in the reference list. For example, [1] represents the first reference cited in the reference list, namely, Manthiram, A.; Fu, Y.; Chung, S.-H.; Zu, C.; Su, Y.-S. Rechargeable Lithium-Sulfur Batteries. *Chem. Rev.* 2014, 114, 11751-11787.

FIELD OF THE INVENTION

The present invention relates generally to fabrication of a regenerative polysulfide-scavenging layer, and more particularly to methods and systems for fabricating a regenerative polysulfide-scavenging layer enabling lithium-sulfur (Li—S) batteries with high energy density and prolonged cycling life.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Lithium-sulfur (Li—S) batteries, notable for high theoretical energy capacity, environmental benignity and low cost, hold great potentials for next-generation energy storage [1, 2]. Broad adaption of Li—S batteries, however, has been hampered by their low gravimetric energy density and short cycling life. The limitations are mainly resulted from the low electronic/ionic conductivity, large volumetric change of sulfur species and shuttling effect. During cycling, lithium polysulfide ($Li_2S_n$, n=4-8) may diffuse throughout the cells, triggering parasitic reactions with lithium-metal anodes and consequently compromising the cycling life of the cells [3].

Extensive efforts have been made to address such limitations. One focus is to infiltrate sulfur into conductive scaffolds [4-10]. Polysulfides, which are generated continuously during the discharging process, may still diffuse throughout the cells. To restrain the diffusion, various materials have been coated onto the separators. For example, polymer layers [11-13], represented by Nafion® with sulfonated moieties ($—SO_3^-$), may block the diffusion of polysulfides anions through electrostatic repulsion. High loading of high-cost Nafion®, however, is required to achieve sufficient blocking effect (e.g., 0.7 mg $cm^{-2}$ loading of Nafion® for cathodes with 0.53 mg $cm^{-2}$ loading of sulfur) [12]. The metal-oxide layers, represented by $V_2O_5$ layers, allow effective transport of $Li^+$ ions while block the diffusion of polysulfides [14]. Such inorganic coatings, however, are generally achieved by sol-gel process, which are often brittle and defective. In addition, extensive research on carbon-coated separators has been conducted, utilizing carbon nanotubes (CNTs) [15-20], graphene [21, 22], carbon black [23-25], carbon fibers [26], porous carbons [27-30], as well as composites of carbons and non-reactive inorganic moieties (e.g., $Al_2O_3$ [31], $TiO_2$ [32] and $SiO_2$) [33] as adsorbents. Through physisorption of polysulfides, such carbon-coated separators help mitigate the shuttling effect; however, the effectiveness and enhancement is mostly limited to cathodes with low sulfur loadings (<2 mg $cm^{-2}$). Therefore, it remains challenging to develop effective polysulfide-blocking layers for high loading cathodes (>6 mg $cm^{-2}$) to achieve high specific energy (>350 Wh. $kg^{-1}$) and prolonged cycling life (>100 cycles) [34].

Therefore, a heretofore unaddressed need exists in the art to address the aforementioned deficiencies and inadequacies.

SUMMARY OF THE INVENTION

One of the objectives of this invention is to fabricate regenerative polysulfide-scavenging layers (RSL) enabling lithium-sulfur batteries with high energy density and prolonged cycling life.

In certain aspects, this invention discloses an effective polysulfide-blocking strategy based on regenerative polysulfide-scavenging layers (RSL), which can dynamically block the diffusion of polysulfides and regenerate themselves during cycling.

In one aspect, the invention relates to a method for fabricating a RSL. The method includes embedding nanowires or nanocrystals of metal oxides with a membrane of carbon nanotubes (CNTs); and forming the RSL with the embedded nanowires or nanocrystals of the metal oxides and the membrane, so as to enable lithium-sulfur batteries with high energy density and prolonged cycling life.

In one embodiment, the nanowires or nanocrystals of the metal oxides and the membrane form a continuous fibrous structure.

In one embodiment, the nanowires or nanocrystals of the metal oxides are porous with a diameter of about 30 nanometers. The metal oxides include $V_2O_5$.

In one embodiment, the nanowires or nanocrystals of the metal oxides are layered crystalline structures.

In one embodiment, the weight percentage of the CNTs in the RSL is about 9.8%.

In one embodiment, the membrane is flexible and conductive.

In one embodiment, the RSL has a thickness of 15 μm and includes porous CNTs layers sandwiched with a $V_2O_5$-rich layer in the center.

In one embodiment, the method further includes disposing the RSL between a layer of sulfur cathode and a separator.

In one embodiment, the location of the embedding nanowires or nanocrystals of metal oxides with a membrane is in the center of the membrane.

In one embodiment, during discharging, as-generated polysulfides are adsorbed by or reacted with the RSL and are immobilized onto the RSL denoted as Polysulfides-RSL complexes; and a subsequent charging process strips away the immobilized Polysulfides-RSL complexes and regenerates the RSL, enabling dynamic blocking of the as-generated polysulfides.

In another aspect, the invention relates to a method of fabricating a regenerative polysulfide-scavenging layer (RSL) that includes synthesizing composites of metal oxide nanowires intertwined with carbon nanotubes (CNTs) using hydrothermal reaction; dispersing the CNTs and CNTs/metal oxide composites in ethanol by sonication; filtrating dispersion of the CNTs, the CNTs/metal oxide composites and the CNTs through a polypropylene membrane; and forming a flexible triple-layered membrane to fabricate the RSL.

In one embodiment, the metal oxide nanowires are made from $V_2O_5$.

In one embodiment, the method further includes entangling the CNTs from the dispersing to form CNTs networks for effective electron conduction, thereby allowing performing effecting redox reaction with CNTs/$V_2O_5$ RSL.

In one embodiment, the method further includes the following steps after the dispersing: forming a CNT suspension having a first concentration and a CNTs/$V_2O_5$ suspension having a second concentration, respectively; selecting a first volume of the CNT suspension and a second volume of the CNTs/$V_2O_5$ suspension; and filtering the first volume of the CNT suspension and the second volume of the CNTs/metal oxide suspension through the polypropylene membrane.

In one embodiment, the method further includes drying the flexible triple-layered membrane at a first temperature for a first predetermined time; and punching the flexible triple-layered membrane into a round shape with a diameter.

In one embodiment, the synthesizing includes: dispersing a first mass of ammonium metavanadate and a second mass of P123 (EO20PO70EO20) in a first volume of deionized (DI) water with a second volume of 2 molar (M) HCl to form a mixture; adding activated CNTS to the mixture and sonicating for a first time; stirring the mixture at a room temperature for a second time; transferring the mixture to an autoclave; heating the mixture at a second temperature for a second predetermined time; rinsing the mixture with the DI water and ethanol for three times; and drying the mixture at a third temperature in vacuum.

In one embodiment, the weight of the RSL on each separator is around 0.4-0.6 mg cm$^{-2}$.

In yet another aspect, the invention relates to a lithium-sulfur battery that includes an anode using lithium metal; a polypropylene separator adjacent to the anode; a sulfur anode opposed to the anode; and a regenerative polysulfide-scavenging layer (RSL) disposed between the polypropylene separator and the sulfur anode. The RSL is fabricated by embedding nanowires or nanocrystals of metal oxides with a membrane of carbon nanotubes (CNTs).

In one embodiment, the sulfur anode is prepared using a slurry casting method.

In one embodiment, for electrodes with low sulfur loading with a density of 1-2 mg cm$^{-2}$, sulfur, carbon black and polyvinylidene fluoride (PVDF) are mixed with a weight ratio of 5:4:1 to form a homogenous slurry with N-methyl-2-pyrrolidone, and then are casted onto a carbon-coated aluminum foil with a doctor blade; and for electrodes with higher sulfur loading with a density up to 6 mg cm$^{-2}$, carbon/sulfur composites, carbon nanofiber, carbon black and PVDF are mixed with a weight ratio of 88:4:1:7 to form a slurry.

In one embodiment, porous carbon particles are fabricated using Kejent black, and carbon and sulfur composites are prepared using liquid infiltration method at 159° C. with a weight ratio of 1:4.

In one embodiment, the electrodes are dried at 70° C. in vacuum for four hours and then cut into pieces with a diameter of 16 mm.

Lithium-sulfur batteries, notable for high theoretical energy density, environmental benignity and low cost, hold great potentials for next-generation energy storage. Polysulfides, the intermediates generated during cycling, may shuttle between electrodes, compromising the energy density and cycling life. In certain embodiments, a class of regenerative polysulfide-scavenging layers (RSL) is reported, which effectively immobilize and regenerate polysulfides, especially for electrodes with high sulfur loadings (e.g., 6 mg cm$^{-2}$). The resulted cells exhibit high gravimetric energy density of 365 Wh. kg$^{-1}$, initial areal capacity of 7.94 mAh cm$^{-2}$, a low self-discharge rate of 2.45% after resting for 3 days and dramatically prolonged cycling life. Such blocking effects have been thoroughly investigated and correlated with the work functions of the oxides, as well as their bond energies with polysulfides. This work offers not only a class of RSL to mitigate shuttling effect, but also a quantified design framework for advanced lithium-sulfur batteries.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 2A, SEM image of a CNTs/$V_2O_5$ composite with a fibrous structure made from interpenetrative $V_2O_5$ nanowires and CNTs. FIG. 2B, TEM images of the CNTs/$V_2O_5$ composites, showing a continuous and porous structure with average nanowire diameter of ~30 nm. FIG. 2C, High-resolution TEM image and its corresponding selected area FFT image (inset) of the CNTs/$V_2O_5$ composites. FIG. 2D, X-ray diffraction profile of the CNTs/$V_2O_5$ composites. FIG. 2E, Cross-section SEM image of a CNTs/$V_2O_5$ RSL made from two CNTs layers and a sandwiched CNTs/$V_2O_5$ layer. Scale bars are FIG. 2A, 500 nm; FIG. 2B, 50 nm, 10 nm (inset); FIG. 2C, 5 nm, 1 nm (inset); FIG. 2W, 5 μm, respectively.

FIG. 3A shows cyclic voltammetries obtained at a scanning rate of 0.2 mV s$^{-1}$. FIG. 3B shows Nyquist plots showing a reduced charge-transfer resistance with the RSL. FIG. 3C shows rate performance at 0.3 C, 0.5 C, 1 C, 2 C, 4 C and 0.3 C rate (sulfur loading 2 mg cm$^{-2}$). FIGS. 3D-3F show galvanostatic cycling performance at 1 C rate, 0.1 C rate and 0.2 C rate, respectively. The empty bullets (○) represent the discharge capacity and circle bullets (•) represent the Coulombic efficiency. Cells in FIG. 3E were activated at 0.05 C rate while cells in FIG. 3F. were activated at 0.1 C rate. FIGS. 3G and 3H shows self-discharge tests. The cells were cycled at 0.2 C for 9 cycles, stopped at 2.1 V during 10$^{th}$ discharge and rested for 3 days before the discharging process was resumed. Voltage-capacity profiles of the cells were recorded, suggesting the cell with CNTs/$V_2O_5$ RSL exhibit a dramatically reduced self-discharge rate.

FIG. 4A was interrupted at 2.05 V during the discharging and FIG. 4B was interrupted at 2.60 V during the charging. The arrows from circles show the direction of the line scan, while the circles represent the starting and ending points. A purple line represents sulfur and an orange line represents vanadium. Scale bars are 20 μm for FIG. 4A and 25 μm for FIG. 4B.

FIG. 5A, Vanadium $2p_{3/2}$ spectra of $V_2O_5$ and FIG. 5B, $V_2O_5$/sulfide compound formed by reacting $V_2O_5$ with $Li_2S_6$, indicating the formation of $V^{4+}$ in the presence of $Li_2S_6$. FIG. 5C, Sulfur 2p core spectra of $Li_2S_6$ showing the terminal ($S_T^{-1}$) and bridging ($S_B^0$) sulfur atoms with an expected ratio of 1:2. FIG. 5D, Sulfur 2p core spectra of the $V_2O_5$/sulfide compound. The formation of polythionate groups indicates redox reactions between $Li_2S_6$ and $V_2O_5$.

FIG. 10(A) as-prepared, FIG. 10(B) folded; and FIG. 10(C) recovered states, according to one embodiment of the invention.

FIG. 15A shows scavenging capacitance of the CNTs and CNTs/V$_2$O$_5$ RSL at different Li$_2$S$_6$ concentrations, according to one embodiment of the invention.

FIGS. 15B and 15C show cyclic voltammetries of the equilibrated CNTs RSL and the equilibrated CNTs/V$_2$O$_5$ RSL cathodes at a scanning rate of 0.05 mV s$^{-1}$, according to one embodiment of the invention. CNTs and CNTs/V$_2$O$_5$ RSL were equilibrated in Li$_2$S$_6$ solutions with various concentrations, respectively. After wiping off the residual solution on the surface, cells were assembled using the equilibrated RSL as the cathode and lithium metal as the anode. Both cells exhibit an open circuit voltage (OCV) of about 2.36 V, which is the same as the redox potential of the polysulfides. The cells were then hold at 2.8 V till the current reached 1 μA, during which the Li$^+$ from the adsorbed polysulfides were stripped off from the RSL. The total charges were measured and converted to the amount of Li$_2$S$_6$ adsorbed on the RSL.

DETAILED DESCRIPTION OF THE INVENTION

Figure 1:
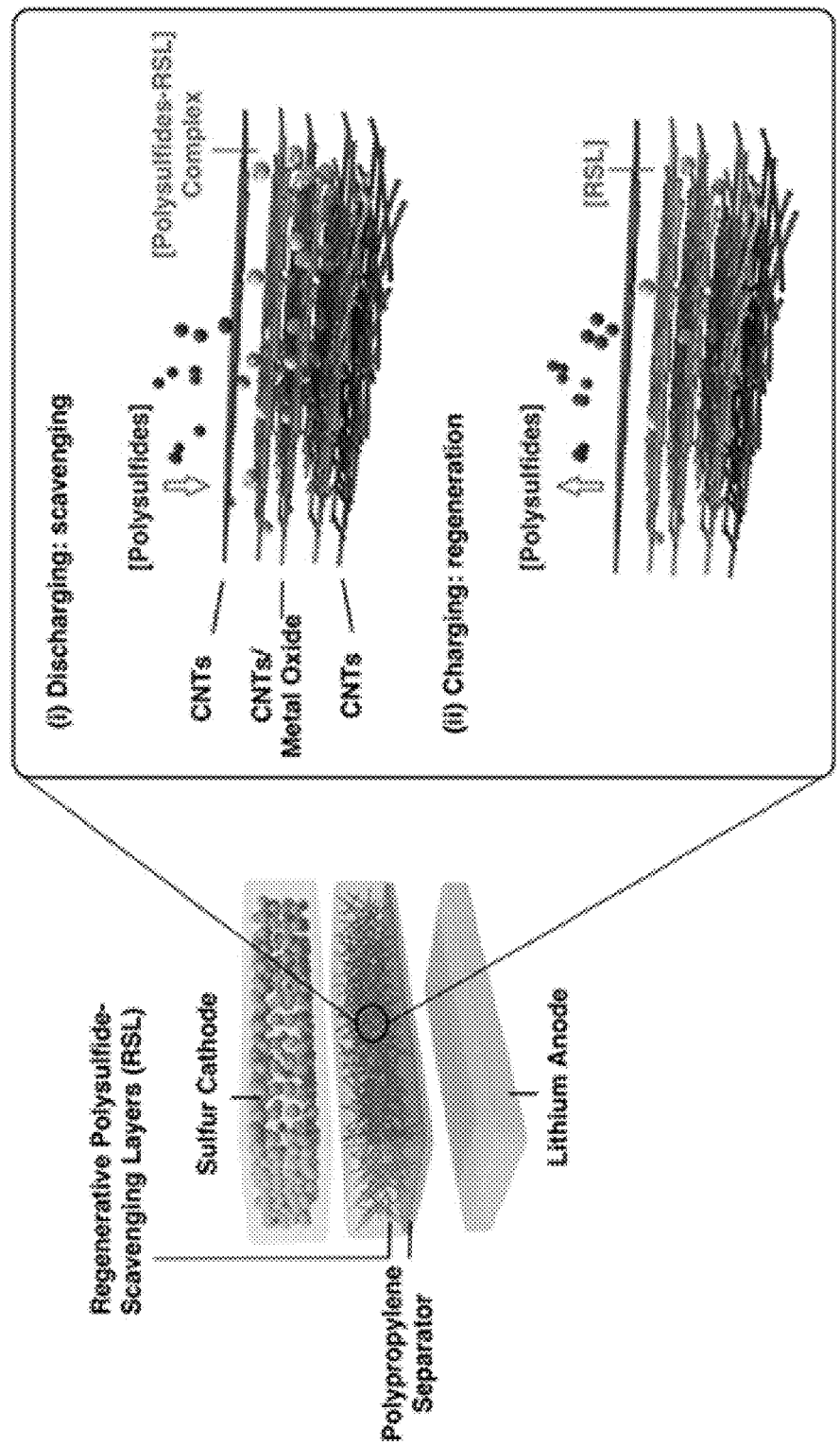
FIG. 1 shows a schematic presentation of a Li—S cell with a regenerative polysulfide-scavenging layer (RSL), according to one embodiment of the invention. The RSL is made from a CNTs membrane of which the center is embedded with interpenetrating nanowires or nanocrystals of metal oxides. (i) During discharging, as-generated polysulfides are adsorbed by or reacted with the RSL, immobilized onto the RSL denoted as [Polysulfides-RSL] complexes. (ii) Subsequent charging process strips away the immobilized species and regenerates the RSL, enabling dynamic blocking of the polysulfides.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more". The word "exemplary" is used herein to mean "serving as an example, instance, or illustration". Any aspect described herein as "exemplary" is not necessarily to be construed as preferred or advantageous over other aspects. Unless specifically stated otherwise, the term "some" refers to one or more. Combinations such as "at least one of A, B, or C", "one or more of A, B, or C", "at least one of A, B, and C", "one or more of A, B, and C", and "A, B, C, or any combination thereof" include any combination of A, B, and/or C, and may include multiples of A, multiples of B, or multiples of C. Specifically, combinations such as "at least one of A, B, or C", "one or more of A, B, or C", "at least one of A, B, and C", "one or more of A, B, and C", and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module", "mechanism", "element", "device" and the like may not be a substitute for the word "means". As such, no claim element is to be construed as a means plus function unless the element is expressly recited using the phrase "means for". It should also be understood that one or more steps within a method may be executed in different order (or concurrently) without altering the principles of the invention.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower" can, therefore, encompass both an orientation of "lower" and "upper", depending on the particular orientation of the figure. Similarly, if the device in one of the Figure is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

The description is now made as to the embodiments of the invention in conjunction with the accompanying drawings. Various modifications to these aspects will be readily apparent to those skilled in the art, and the generic principles defined herein may be applied to other aspects. In accordance with the purposes of this invention, as embodied and broadly described herein, this invention relates to methods and systems for fabricating a regenerative polysulfide-scavenging layer enabling lithium-sulfur (Li—S) batteries with high energy density and prolonged cycling life.

In certain aspects, this invention discloses an effective polysulfide-blocking strategy based on regenerative polysulfide-scavenging layers (RSL), which can dynamically block the diffusion of polysulfides and regenerate themselves during cycling.

Lithium-sulfur batteries, notable for high theoretical energy density, environmental benignity and low cost, hold great potentials for next-generation energy storage. Polysulfides, the intermediates generated during cycling, may shuttle between electrodes, compromising the energy density and cycling life. In certain embodiments, a class of regenerative polysulfide-scavenging layers (RSL) is reported, which effectively immobilize and regenerate polysulfides, especially for electrodes with high sulfur loadings (e.g., 6 mg cm$^{-2}$). The resulted cells exhibit high gravimetric energy density of 365 Wh kg$^{-1}$, initial areal capacity of 7.94 mAh cm$^{-2}$, low self-discharge rate of 2.45% after resting for 3 days and dramatically prolonged cycling life. Such blocking effects have been thoroughly investigated and correlated with the work functions of the oxides, as well as their bond energies with polysulfides. This work offers not only a class of RSL to mitigate shuttling effect, but also a quantified design framework for advanced lithium-sulfur batteries.

As illustrated in FIG. 1, the RSL are made from flexible and conductive membranes of carbon nanotubes (CNTs), in which the center layers are embedded with nanowires or nanocrystals of metal oxides. The outward diffused polysulfides are adsorbed by or reacted with the RSL, forming [Polysulfides-RSL] complexes and being immobilized within the RSL. Subsequent charging process stripes away these polysulfides and regenerates the RSL. This combination of large amount of polysulfides scavenged and the regenerative capability affords highly effective and dynamic scavenging of polysulfides, leading to dramatically reduced lithium corrosion and prolonged cycling life, especially for electrodes with high sulfur loadings. Furthermore, the RSL are electronically conductive and mechanically robust, thus further enhance the performance of the cells. The scavenging effects, which are originated from the physisorption and chemical reaction with polysulfides, have been thoroughly investigated and correlated with electrochemical performance of the cells.

Figure 7:
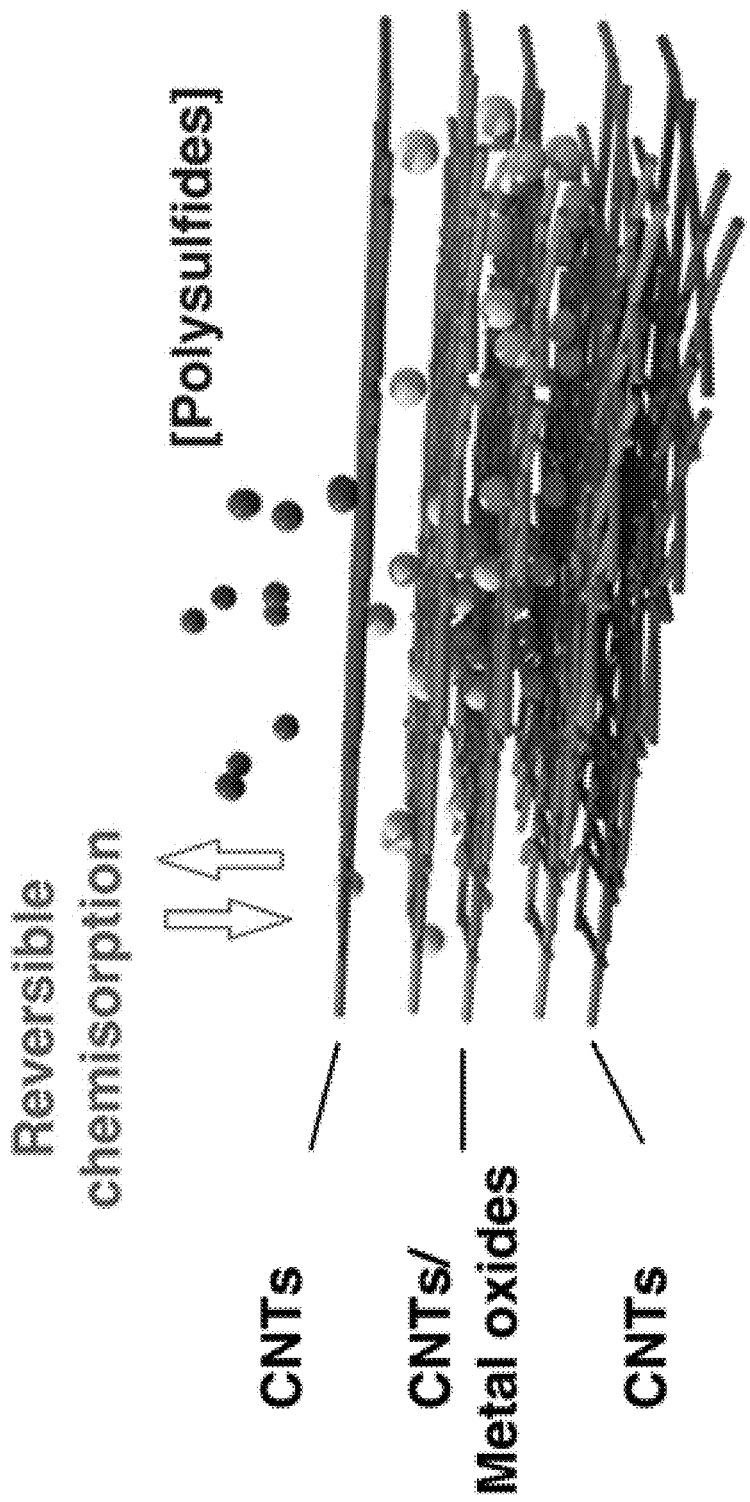
FIG. 7 shows the RSL with scavenging capability for polysulfides and regenerative ability, according to one embodiment of the invention.

Synthesis and Characterization of the RSL: to demonstrate this concept, $V_2O_5$ nanowires were selected as a model oxide, which has been extensively explored for electrochemical energy storage with high capacity (294 mAh g$^{-1}$ with 2 Li$^+$ insertion/extraction per unit), fast Li$^+$ intercalation kinetics, and long cycling life (>500 cycles) [35]. Besides, it exhibits a redox window from 1.8 to 4.0 V (vs. Li$^+$/Li), matching well with the redox window of sulfur (1.7 to 2.8 V vs. Li$^+$/Li). In the exemplary embodiment, the composites of $V_2O_5$ nanowires intertwined with CNTs were synthesized using hydrothermal reaction [36, 37]. Based on such composites, CNTs/$V_2O_5$ RSL was fabricated by sequentially filtration of the dispersion of CNTs, CNTs/$V_2O_5$ composite, and CNTs onto commercial polypropylene separators. During this fabrication process, CNTs from the dispersions can be entangled forming CNTs networks for effective electron conduction, allowing effective redox reactions within the CNTs/$V_2O_5$ RSL. In this context, sufficient conductivity is essential to endow the RSL with scavenging capability for polysulfides and regenerative ability, as shown in FIG. 7.

FIG. 1 shows a schematic presentation of a Li—S cell with a regenerative polysulfide-scavenging layer (RSL). The RSL is made from a CNTs membrane of which the center is embedded with interpenetrating nanowires or nanocrystals of metal oxides: (i) during discharging, as-generated polysulfides are adsorbed by or reacted with the RSL, immobilized onto the RSL denoted as [Polysulfides-RSL] complexes; and (ii) a subsequent charging process strips away the immobilized species and regenerates the RSL, enabling dynamic blocking of the polysulfides.

Specifically, as illustrated in FIG. 1, the RSL are made from flexible and conductive membranes of carbon nanotubes (CNTs), in which the center layers are embedded with nanowires or nanocrystals of metal oxides. The outward diffused polysulfides are adsorbed by or reacted with the RSL, forming [Polysulfides-RSL] complexes and being immobilized within the RSL. A subsequent charging process stripes away these polysulfides and regenerates the RSL. This combination of a large amount of polysulfides scavenged and the regenerative capability affords highly effective and dynamic scavenging of polysulfides, leading to dramatically reduced lithium corrosion and prolonged cycling life, especially for electrodes with high sulfur loadings. Furthermore, the RSL are electronically conductive and mechanically robust, thus further enhance the performance of the cells. The scavenging effects, which are originated from the physisorption and chemical reaction with polysulfides, have been thoroughly investigated and correlated with electrochemical performance of the cells.

Figure 2A:
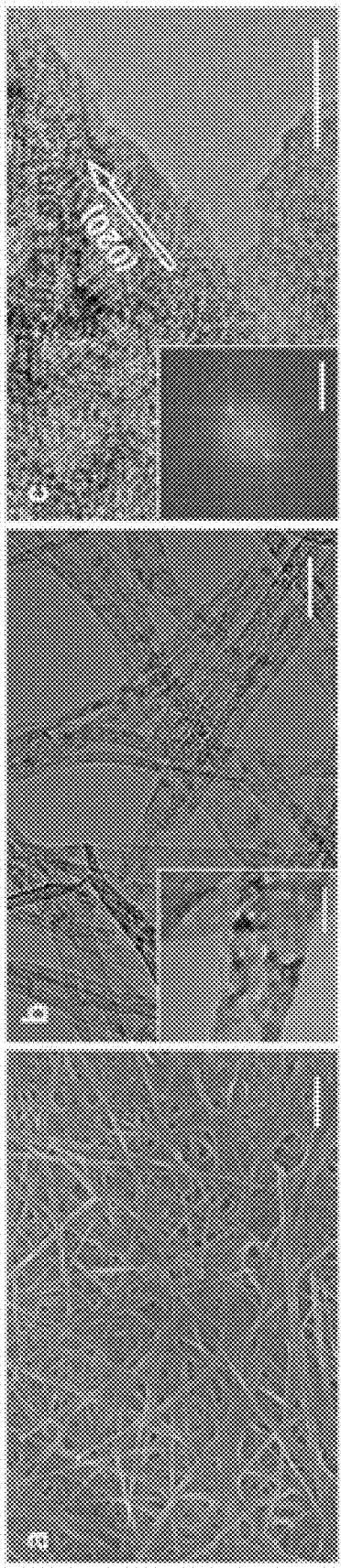
FIGS. 2A-2E show a structure of the CNTs/$V_2O_5$ composites and CNTs/$V_2O_5$ RSL, according to one embodiment of the invention.

FIGS. 2A-3E show a structure of the CNTs/$V_2O_5$ composites and CNTs/$V_2O_5$ RSL. Specifically, FIG. 2A shows SEM images of a CNTs/$V_2O_5$ composite with a fibrous structure made from interpenetrative $V_2O_5$ nanowires and CNTs. FIG. 2B shows transmission electron microscopy (TEM) images of the CNTs/$V_2O_5$ composites, showing a continuous and porous structure with average nanowire diameter of about 30 nm. FIG. 2C shows a high-resolution TEM image and its corresponding selected area Fast Fourier Transformation (FFT) image (inset) of the CNTs/$V_2O_5$ composites. FIG. 2D shows an X-ray diffraction profile of the CNTs/$V_2O_5$ composites. FIG. 2E shows a cross-section SEM image of a CNTs/$V_2O_5$ RSL are made from two CNTs layers and a sandwiched CNTs/$V_2O_5$ layer. Scale bars are 500 nm for FIG. 2A; 50 nm, 10 nm (inset) for FIG. 2B, 5 nm, 1 nm (inset) for FIG. 2C; and 5 µm for FIG. 2E.

Figure 2B:
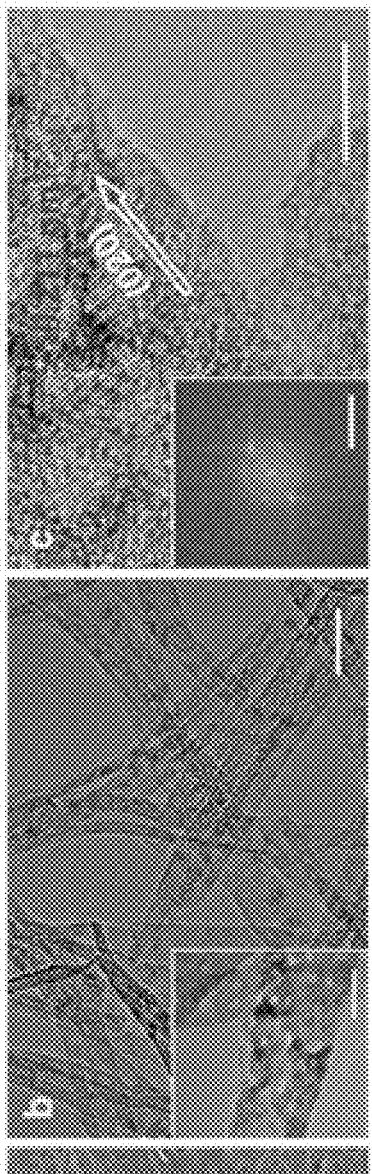
Figure 2C:
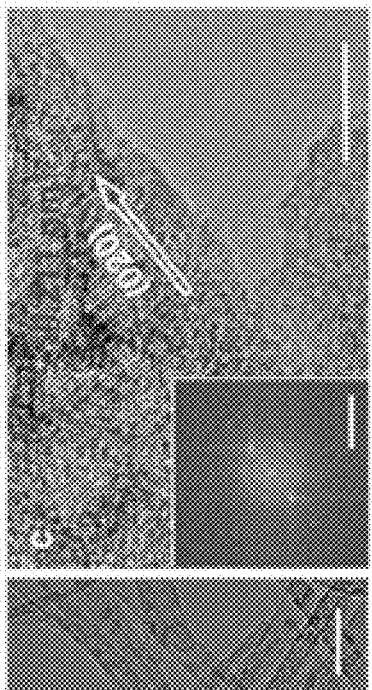
Figure 2D:
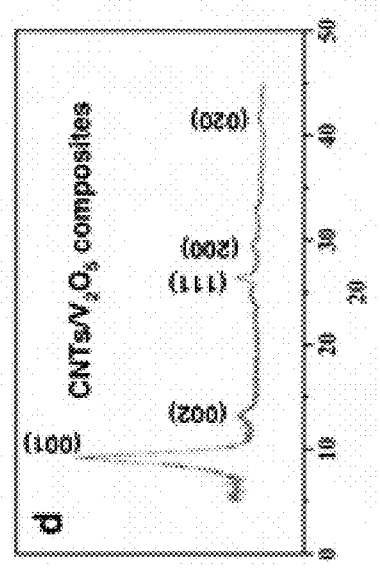
Figure 2E:
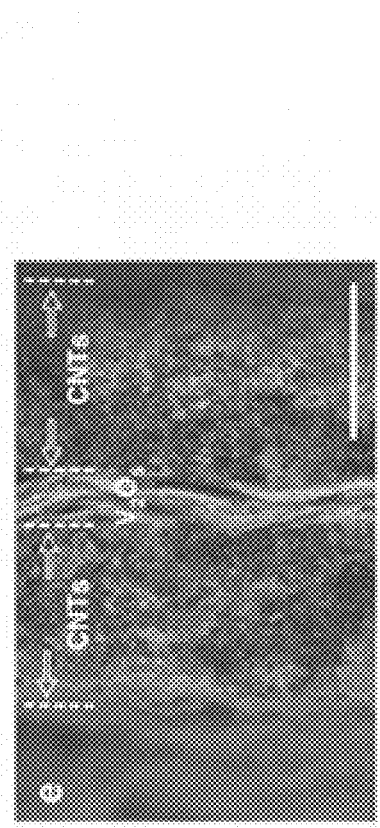
Figure 9:
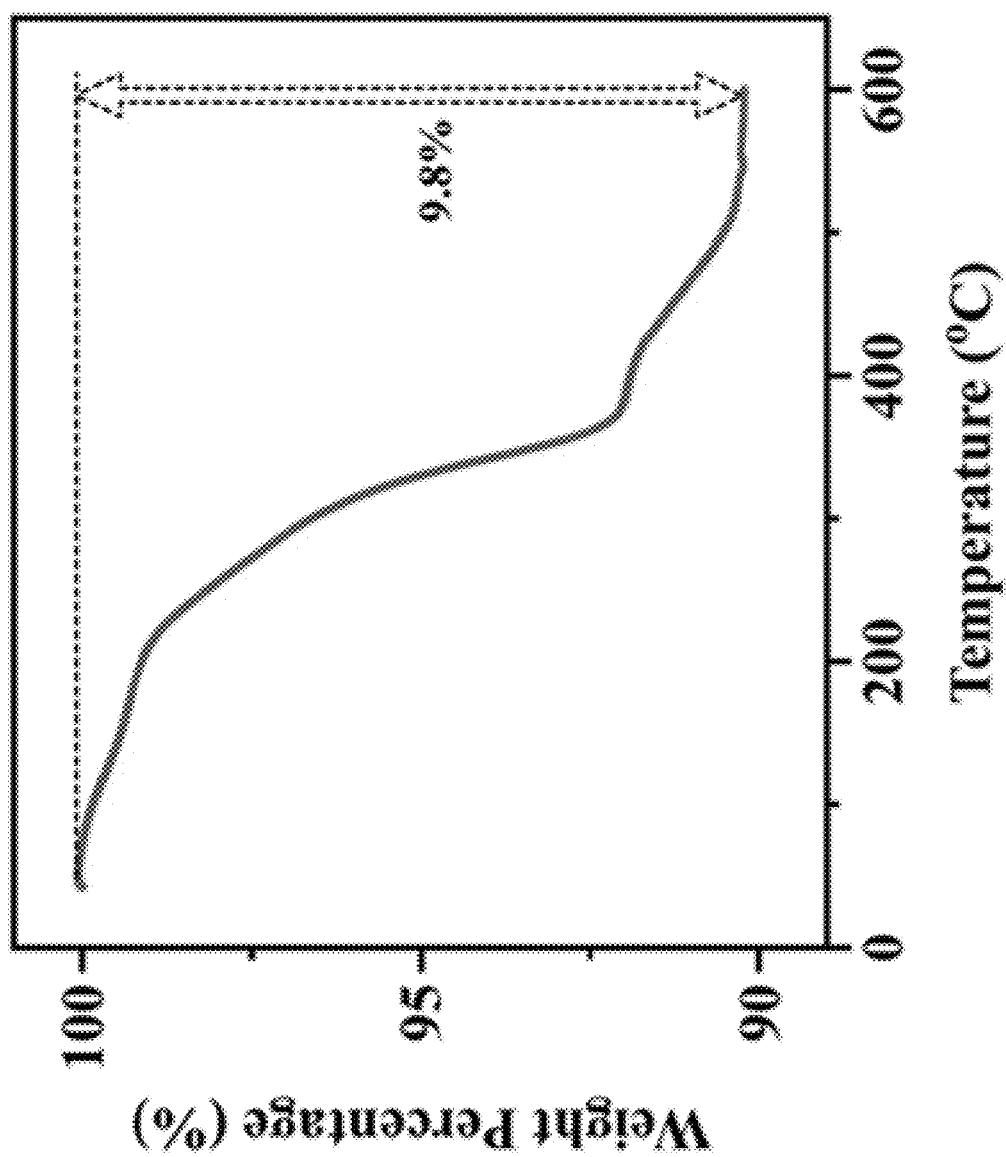
FIG. 9 shows thermogravimetric analysis (TGA) plot of the CNT/$V_2O_5$ composites indicating that the composites contain about 9.8% of CNT, according to one embodiment of the invention.

Specifically, FIGS. 2A and 2B present the scanning electron microscopy (SEM) and transmission electron microscopy (TEM) images of the CNTs/$V_2O_5$ composites, respectively, demonstrating a continuously fibrous structure made from interpenetrative $V_2O_5$ nanowires and CNTs. The nanowires are porous (see inset) with diameters of about 30 nm. FIG. 2C exhibits a high-resolution TEM (HRTEM) image and selected area Fast Fourier Transformation (FFT) of the $V_2O_5$ nanowires, confirming its layered crystalline structure. The HRTEM image displays a d-spacing of 0.211 nm, which is consistent with the (020) lattice plane of $V_2O_5$. X-ray diffraction (XRD) analysis in FIG. 2D reveals the characteristic peaks at 9.2, 13.2, 26.4, 29.1 and 41.8°, corresponding to the (001), (002), (111), (200) and (020) planes of $V_2O_5$ with a layered structure, respectively [38, 39]. Measured by thermogravimetric analysis (TGA), the weight percent of CNTs in the composites is about 9.8%, as shown in FIG. 9. FIG. 2E shows a cross-sectional image of RSL with about 15 µm in thickness, which contains porous CNTs layers sandwiched with a $V_2O_5$-rich layer in the center. Such RSL is also flexible with good mechanical strength, as shown in the digital photographs of FIGS. 10A-10C.

Electrochemical studies: FIG. 3 shows electrochemical performance of Li—S cells with Celgard PP separator, CNTs RSL or CNTs/$V_2O_5$ RSL. Specifically, in FIG. 3A, cyclic voltammetries are obtained at a scanning rate of 0.2 mV $s^{-1}$. In FIG. 3B, Nyquist plots show a reduced charge-transfer resistance with the RSL. FIG. 3C shows rate performance at 0.3 C, 0.5 C, 1 C, 2 C, 4 C and 0.3 C rate (sulfur loading 2 mg $cm^{-2}$). FIGS. 3D, 3E and 3F show galvanostatic cycling performance at 1 C rate, 0.1 C rate and 0.2 C rate, respectively. The empty bullets (○) represent the discharge capacity and circle bullets (•) represent the Coulombic efficiency. Cells in FIG. 3E were activated at 0.05 C rate while cells in FIG. 3F were activated at 0.1 C rate. FIGS. 3G and 3H show self-discharge tests. The cells were cycled at 0.2 C for 9 cycles, stopped at 2.1 V during $10^{th}$ discharge and rested for 3 days before the discharging process was resumed. Voltage-capacity profiles of the cells were recorded, suggesting the cell with CNTs/$V_2O_5$ RSL exhibit a dramatically reduced self-discharge rate.

Figure 3A:
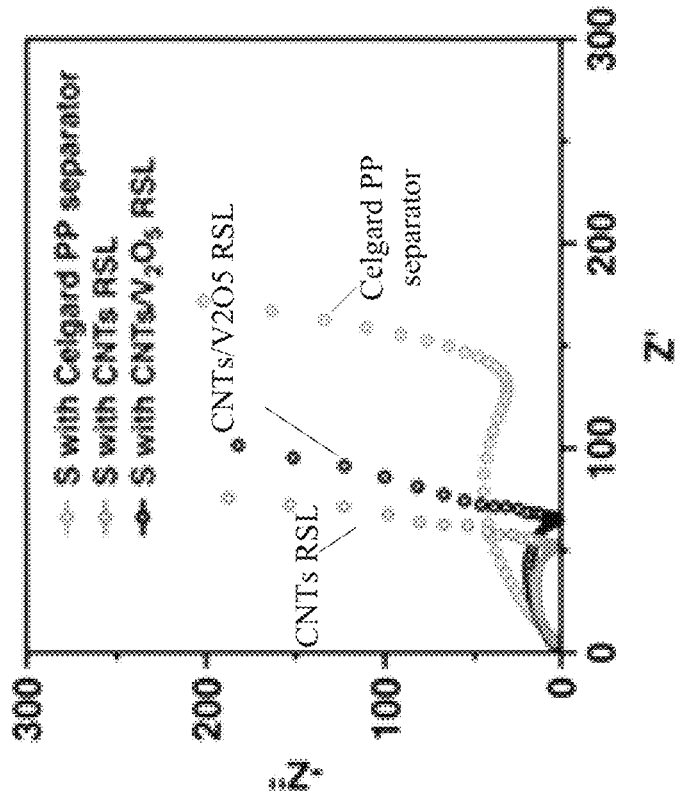
FIGS. 3A-3H show electrochemical performance of Li—S cells with Celgard Polypropylene (PP) separator, CNTs RSL or CNTs/$V_2O_5$ RSL, according to one embodiment of the invention.
Figure 3B:
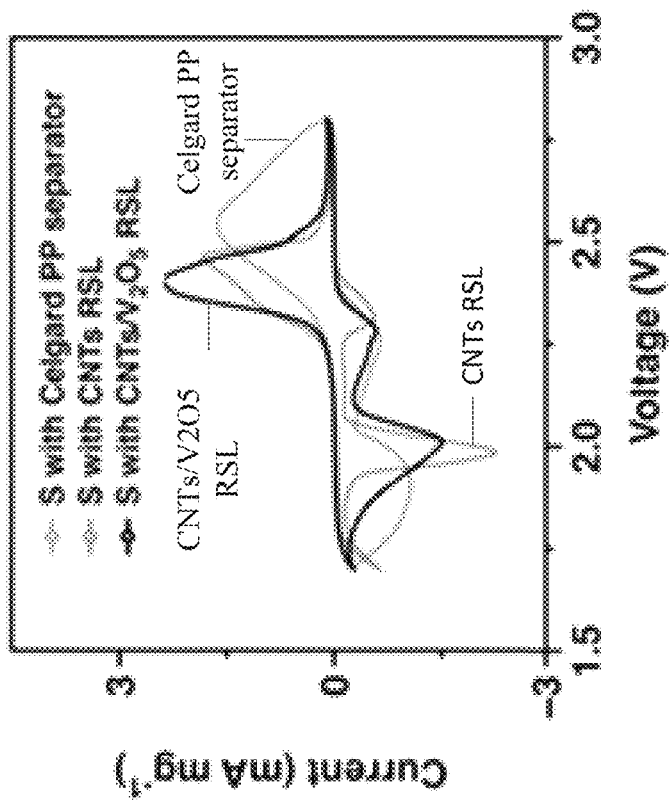
Figure 3C:
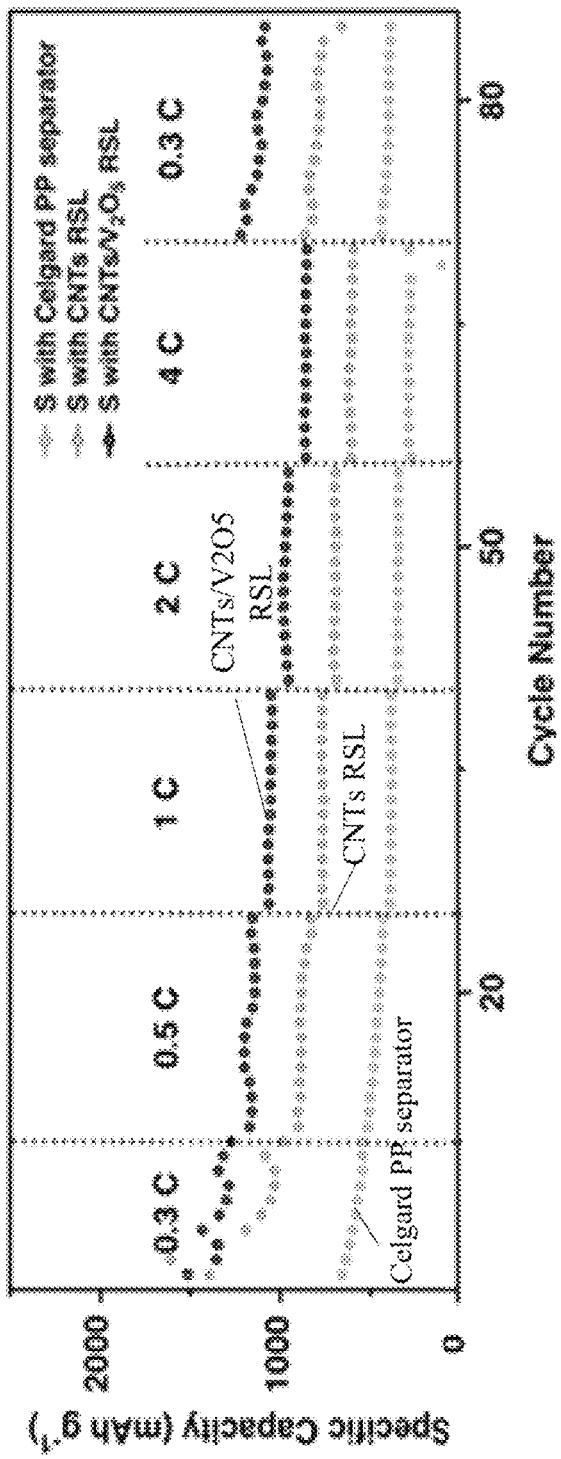
Figure 3D:
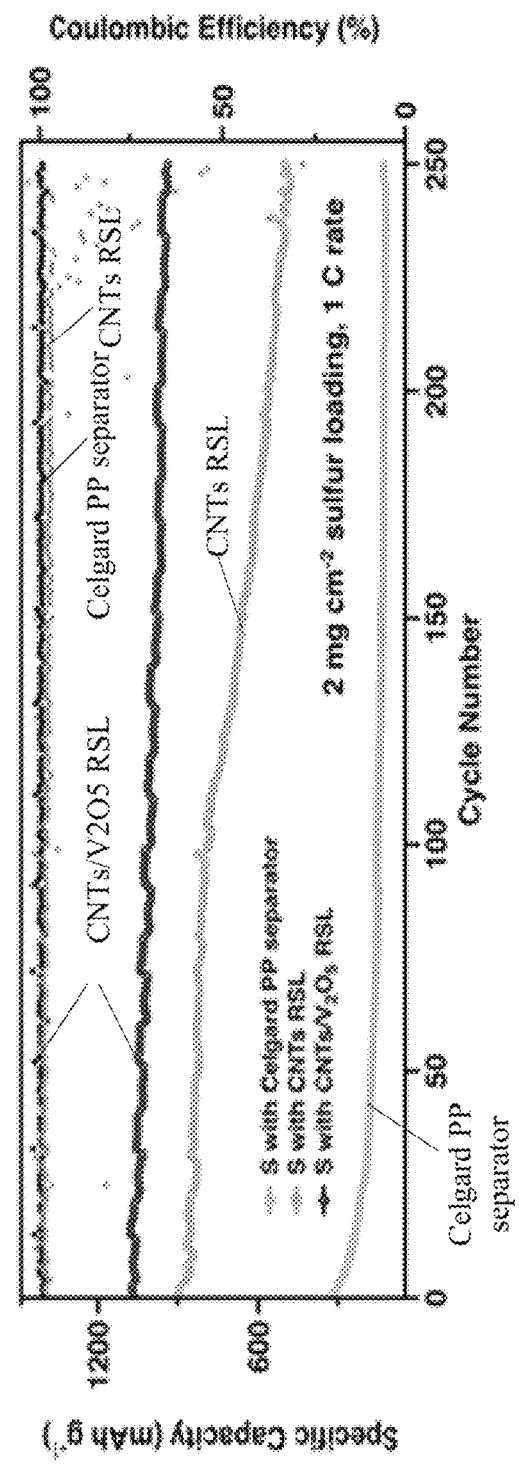
Figure 3E:
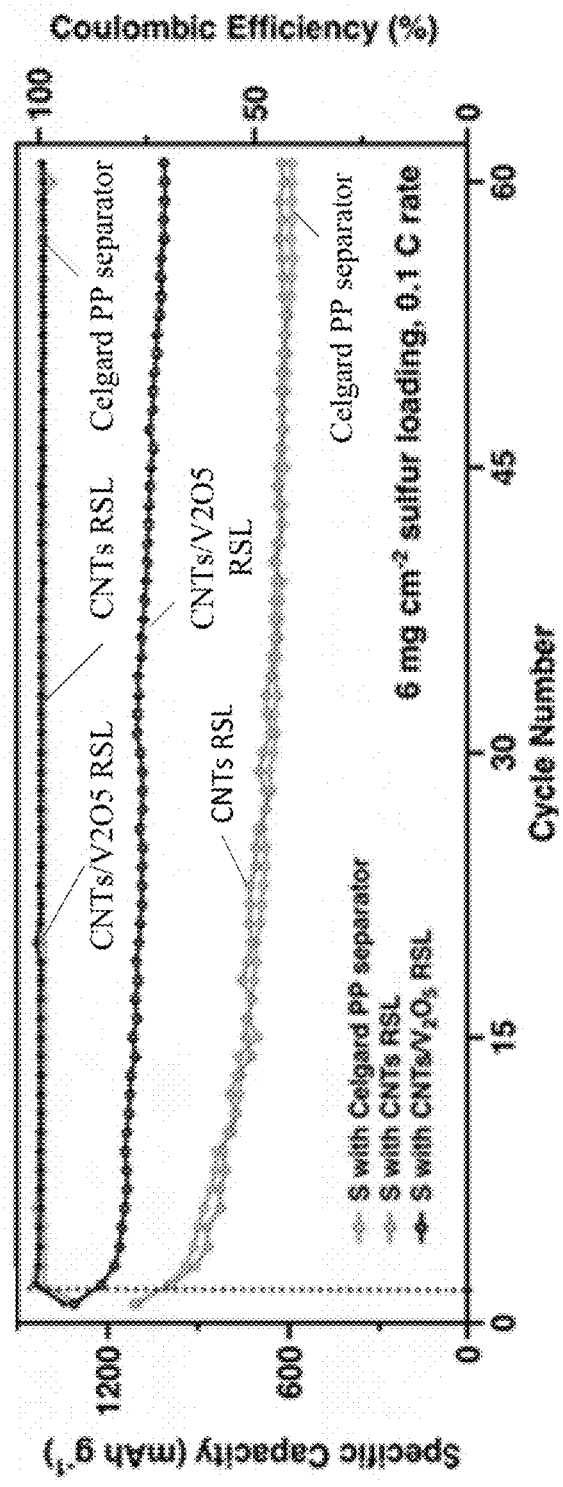
Figure 3F:
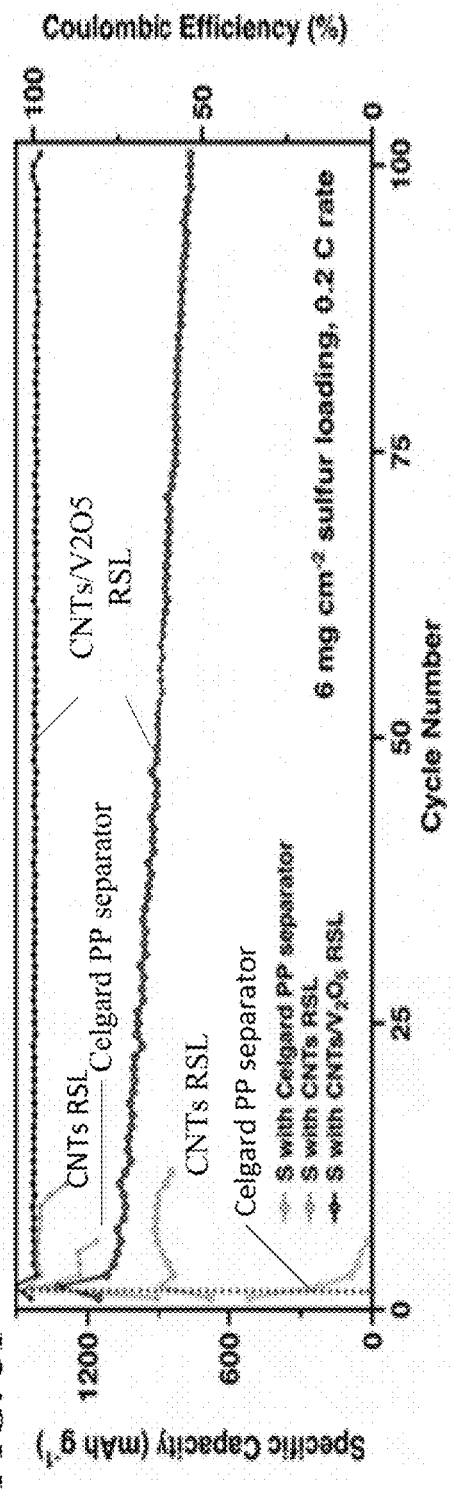
Figure 3G:
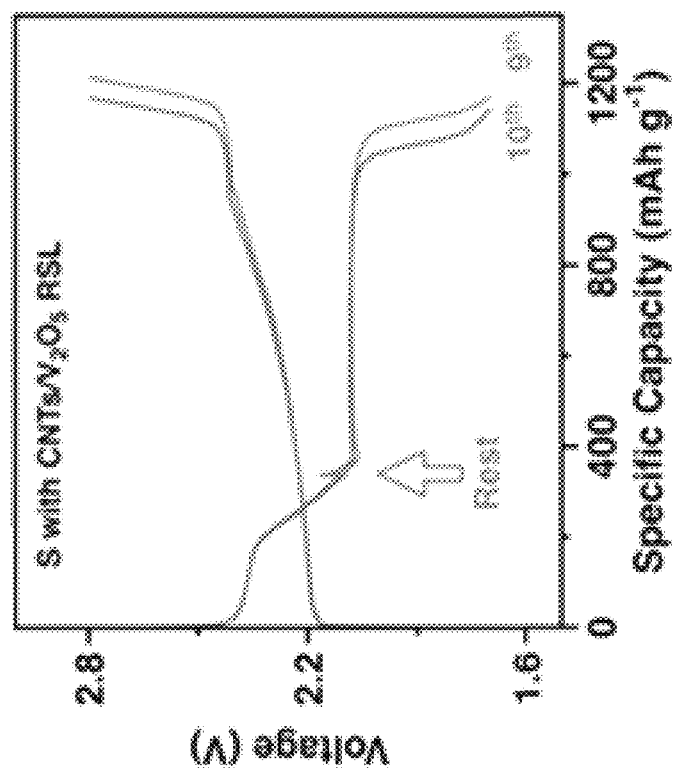
Figure 3H:
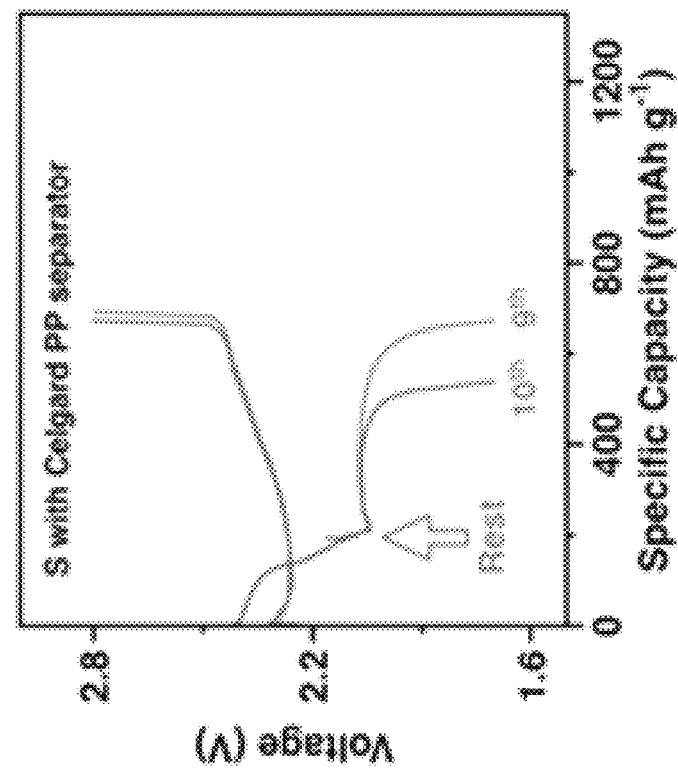

The redox behavior of the sulfur cathodes with Celgard polypropylene (PP) separator or the CNTs/$V_2O_5$ RSL was examined with cyclic voltammetry (CV) at a scanning rate of 0.2 mV $s^{-1}$, as shown in FIG. 3A. To deconvolute the attribution of the CNTs and the $V_2O_5$ moieties, CNTs RSL were fabricated with CNTs via a similar method, as shown in Table 1 below, and integrated with sulfur cathode. All three cathodes present two cathodic peaks corresponding to the reduction of element sulfur and high-order lithium polysulfides, and an anodic peak corresponding to the oxidation of sulfur species [32]. The electrode without RSL shows sluggish electrochemical kinetic, which is resulted from the low electronic and ionic conductivity of the sulfur species [4, 15, 40]. By incorporating the CNTs/$V_2O_5$ RSL or the CNTs RSL, the cathode exhibits well-defined redox peaks with less polarization.

TABLE 1

Composition and thickness of regenerative polysulfide scavenging layers (RSL) made with different metal oxides and/or CNTs. The CNTs RSL has the same mass of the CNTs in the CNTs/oxide RSL, while the CNTs (2) has the same mass of the CNTs/oxide RSL.

| RSL Composition | Mass Loading CNTs/Oxide (mg $cm^{-2}$) | Thickness (µm) |
| --- | --- | --- |
| CNTs | 0.19 | 14 |
| CNTs (2) | 0.54 | 35 |
| CNTs/$Fe_2O_3$ | 0.19/0.34 | 17 |
| CNTs/CuO | 0.19/0.40 | 18 |
| CNTs/$MnO_2$ | 0.19/0.41 | 20 |
| CNTs/$MoO_3$ | 0.19/0.42 | 20 |
| CNTs/$V_2O_5$ | 0.19/0.36 | 17 |
| CNTs/$WO_3$ | 0.19/0.35 | 17 |

FIG. 3B further compares the electrochemical impedance spectroscopy (EIS) of the electrodes, indicating a charge transfer resistance of 160, 70 or 55 ohms with Celgard PP separator, CNTs/$V_2O_5$ RSL or CNTs RSL, respectively. The improved conductivity enhances the rate performance and capacity of the electrode. As shown in FIG. 3C, the sulfur electrode with Celgard PP separator exhibits an initial capacity of 663 mAh $g^{-1}$ at 0.3 C rate (1 C=1675 mA. $g^{-1}$) and reversible capacities of 521, 396, 352, and 272 mAh $g^{-1}$ at 0.5, 1, 2 and 4 C rates, respectively. In addition, the sulfur electrode with CNTs RSL presents an initial capacity of 1396 mAh $g^{-1}$ at 0.3 C rate and reversible capacities of 901, 768, 694 and 614 mAh $g^{-1}$ at 0.5, 1, 2 and 4 C rates, respectively. In contrast, the sulfur electrode with the CNTs/$V_2O_5$ RSL delivers a much higher initial capacity of 1513 mAh $g^{-1}$ at 0.3 C rate and reversible capacities of 1170, 1063, 954 and 858 mAh $g^{-1}$ at 0.5, 1, 2 and 4 C rates, respectively. As-presented electrochemical performance clearly suggests that the incorporation of CNTs/$V_2O_5$ RSL leads to significantly improved rate performance and the utilization of sulfur.

Figure 11:
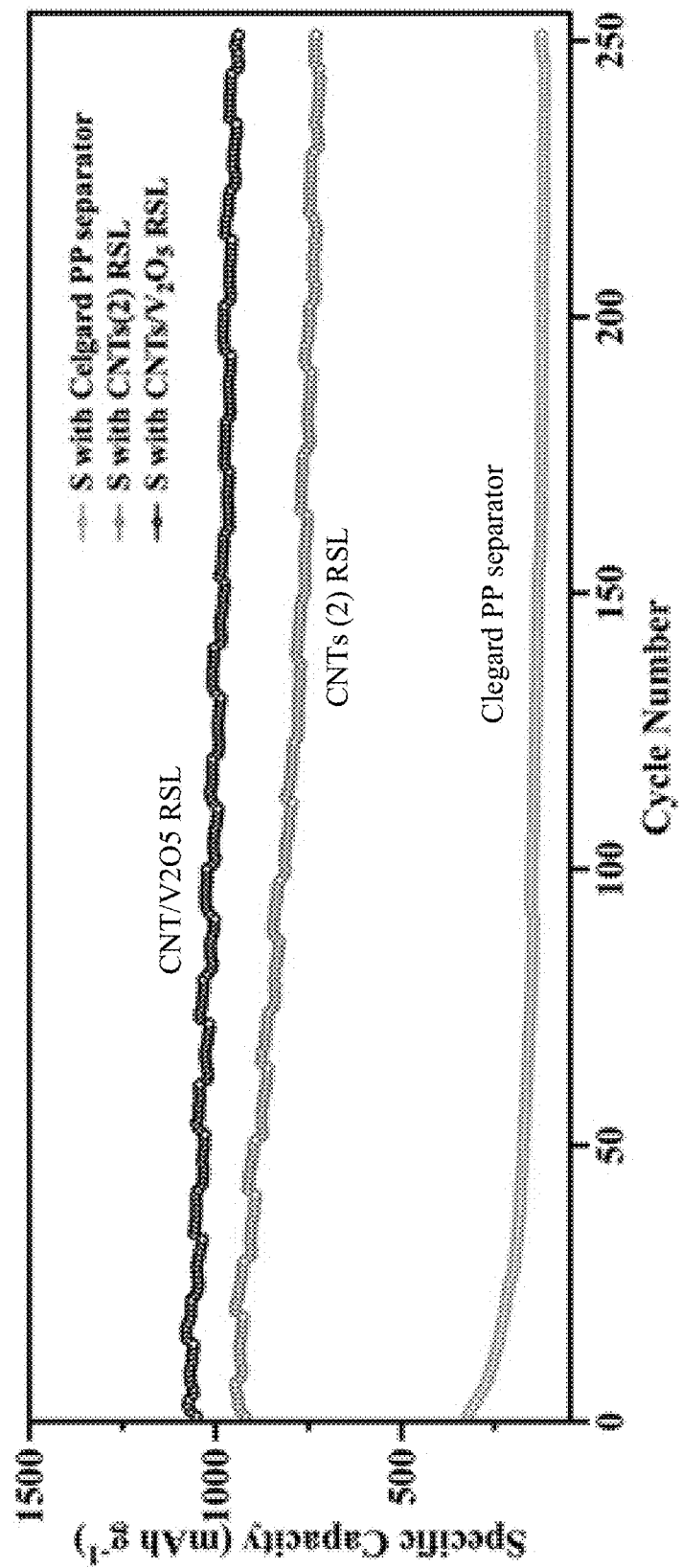
FIG. 11 shows galvanostatic cycling performance of the cells with Celgard PP separator, with CNTs (2) RSL or CNTs/$V_2O_5$ RSL. All cells were cycled at 0.3 C rate for 3 cycles and then 1 C rate for 250 cycles, according to one embodiment of the invention.
Figure 12:
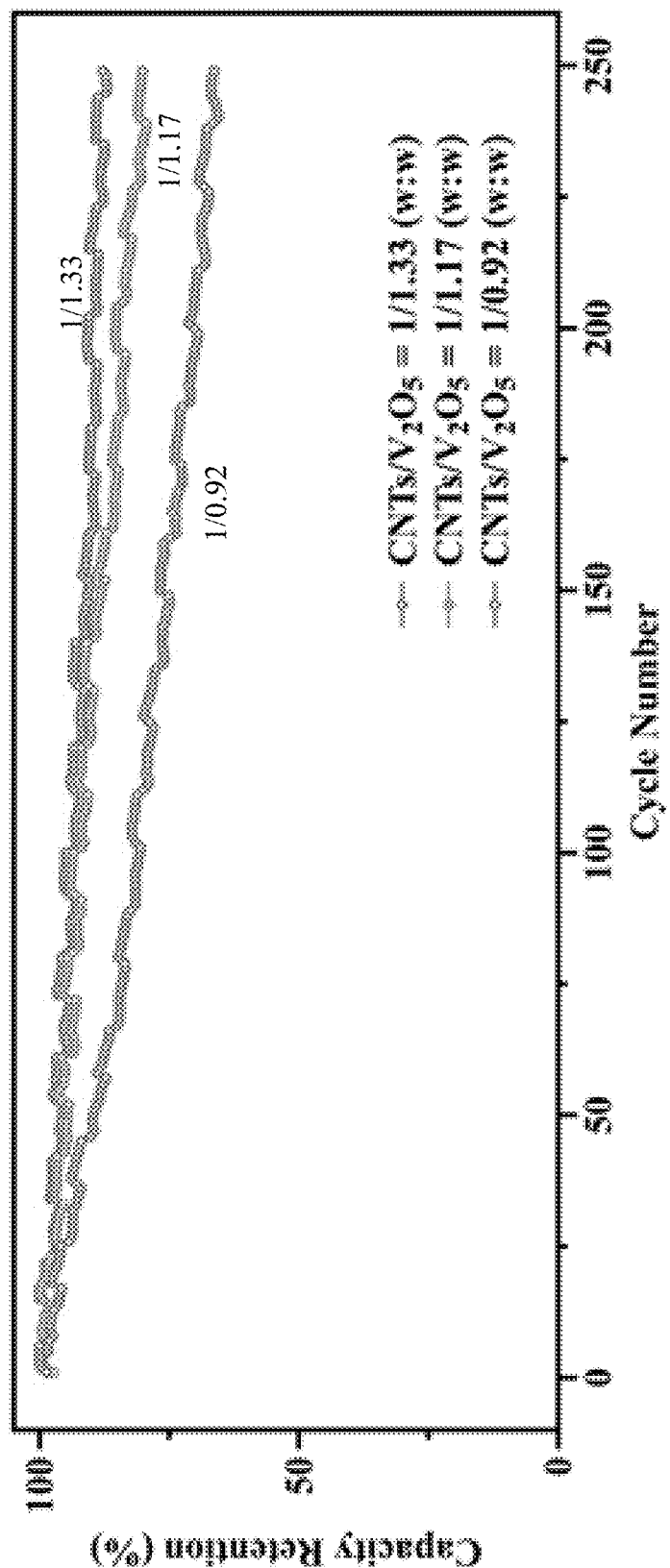
FIG. 12 shows capacity retention of the cells made with CNTs/$V_2O_5$ RSL prepared with different CNTs/$V_2O_5$ mass ratios but a fixed composite mass, according to one embodiment of the invention.
Figure 13:
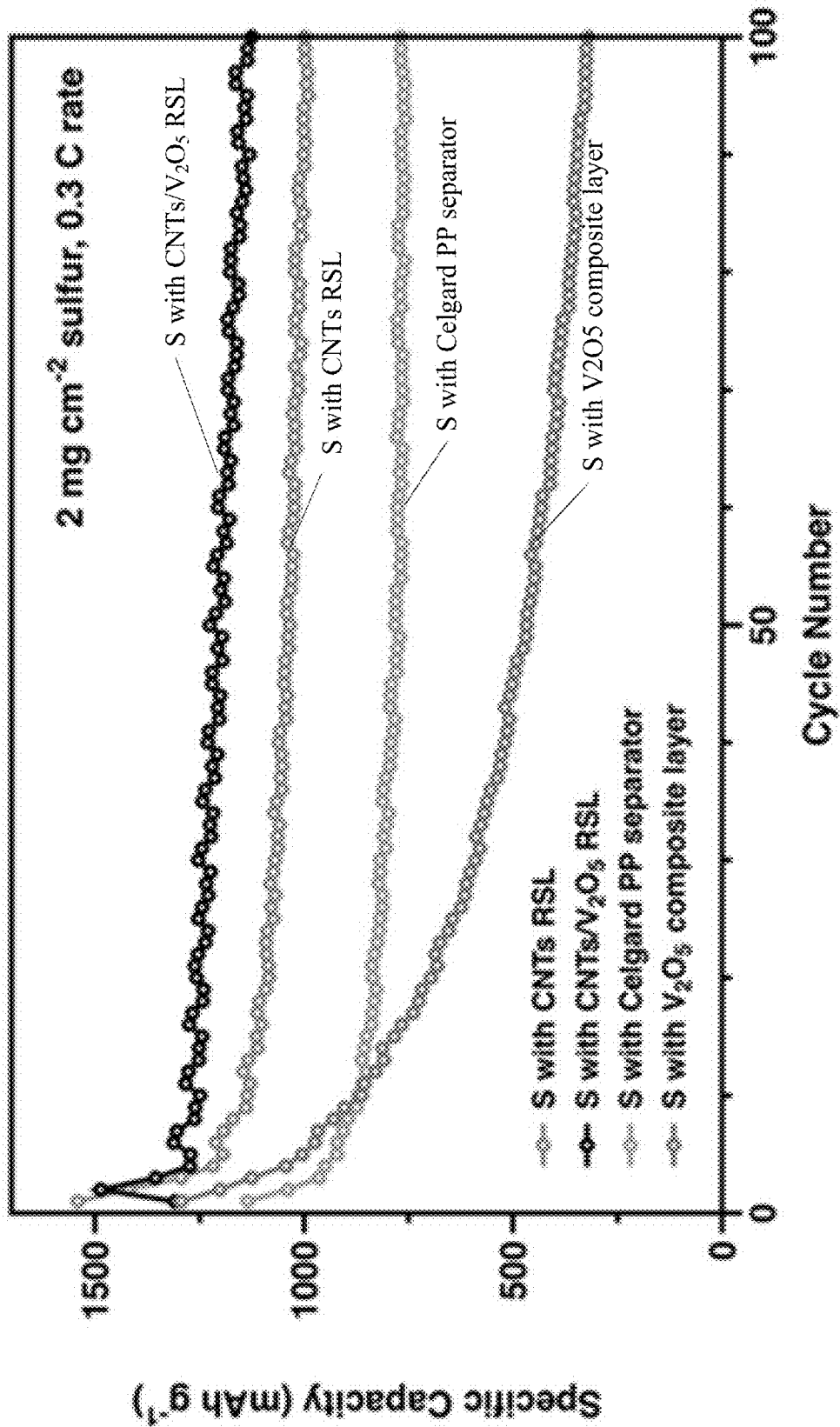
FIG. 13 shows galvanostatic cycling performance of Li—S batteries with Celgard PP separator, CNTs RSL, CNTs/$V_2O_5$ RSL, and $V_2O_5$ composite layer at 0.3 C rate, according to one embodiment of the invention. The CNTs/$V_2O_5$ RSL shows better capacity performance than CNTs RSL due to the regenerative scavengers, and CNTs RSL shows better performance than the Celgard PP separator due to its ability to adsorb and desorb polysulfides. In sharp contrast, the $V_2O_5$ composite layer can effectively scavenge the polysulfides, however, because of its poor conductivity, as-scavenged polysulfides could not be released back during the charging process. Such an un-regenerative process trapped polysulfides continuously within the composite, resulting in continuous decay of the capacity.

Furthermore, FIG. 3D compares the cycling stability of Li—S cells with Celgard PP separator or RSL at 1 C rate. With the conventional separator, a low initial capacity of 315 mAh $g^{-1}$ is observed, which decreases to 124 mAh $g^{-1}$ after 250 cycles, while the cell with the CNTs/$V_2O_5$ RSL delivers a much higher initial capacity of 1068 mAh $g^{-1}$ and a reversible capacity of 939 mAh $g^{-1}$ after 250 cycles. As shown in FIG. 3D, the cell with the CNTs RSL exhibits a reversible capacity of 498 mAh $g^{-1}$ after 250 cycles, which is significantly lower than that with the CNTs/$V_2O_5$ RSL. Furthermore, the one with the CNTs/$V_2O_5$ RSL retains near 100% efficiency after 200 cycles, while the one with the CNTs RSL suffers from severe shuttling effect with dramatically reduced Coulombic efficiency. This comparison indicates that the enhancement in cycling stability is mainly contributed by the $V_2O_5$ moieties. For further comparison, thicker CNTs RSL (denoted as CNTs (2) RSL) were also fabricated, which contain about 2.5 folds of the CNTs. It was found that the cell with CNTs (2) RSL only maintains a reversible capacity of 730 mAh $g^{-1}$ after 250 cycles, as shown in FIG. 11. Consistently, a series of CNTs/$V_2O_5$ RSL with fixed total mass but different mass ratios between $V_2O_5$ and CNTs were also fabricated. With CNTs layers facilitating charge transfer and regeneration of polysulfides, CNTs/$V_2O_5$ RSL with higher percentage of $V_2O_5$ enables better cycling stability of lithium-sulfur batteries, as shown in FIG. 12. Without CNTs layers, $V_2O_5$ moieties continuously adsorb polysulfides during discharging and charging, such un-regenerative process results in rapid capacity decay of lithium-sulfur batteries, as shown in FIG. 13.

In addition, FIGS. 3E and 3F compare the electrochemical performance of the Li—S cells with sulfur loading of 6 mg $cm^{-2}$ at 0.1 C rate and 0.2 C rate, respectively. At 0.1 C rate, the cells with CNTs RSL and Celgard PP separator deliver similar capacity and cycling stability, while the cell with the CNTs/$V_2O_5$ RSL exhibits significantly higher initial capacity at 0.05 C rate (1309 mAh $g^{-1}$ vs. about 1105 mAh $g^{-1}$) and capacity retained after 50 cycles at 0.1 C rate (1037 mAh $g^{-1}$ vs. about 613 mAh $g^{-1}$). Although the use of CNTs RSL improves the performance of cells with low sulfur loading (e.g., <2 mg $cm^{-2}$), improvement over PP separators could not be observed for cells with high-sulfur loading (e.g., 6 mg $cm^{-2}$), which may be due to their low adsorption capacity for polysulfides. The initial specific capacities and sulfur contents of the lithium-sulfur cells are further calculated based on the total weight of the cathodes, which includes the weights of the carbon/sulfur composite, conductive agent, binder and RSL. As shown in Table 2, consideration of the weight contribution from the CNTs/$V_2O_5$ RSL only slightly reduces the sulfur content from 70.4% to 66.6%. Given that incorporating the CNTs/$V_2O_5$ RSL significantly enhances the utilization of sulfur, the specific capacity of the cathode with CNTs/$V_2O_5$ RSL is still much higher than those with CNTs RSL or Celgard PP separator (814 mAh $g^{-1}$ vs. about 700 mAh $g^{-1}$). Moreover, the enhancement in electrochemical performance becomes more pronounced at 0.2 C rate. The cell with the CNTs/$V_2O_5$ RSL delivers a capacity of 1323 mAh $g^{-1}$ and an area capacity of 7.94 mAh $cm^{-2}$ after the $1^{st}$ activation cycle, and maintains about 100% Coulombic efficiency for 100 cycles. On the contrary, the cell with the CNTs RSL exhibits a lower capacity of 890 mAh $g^{-1}$ during the $2^{nd}$ cycle and failed after 12 cycles due to the shuttling effect. Owing to the high charge transfer resistance, the cell with Celgard PP separator lost most of its capacity after 6 cycles. This observation further confirms that CNTs reduce the charge transfer resistance of the electrodes; while $V_2O_5$ does endow the RSL with better blocking capability for polysulfides, alleviate lithium corrosion and dramatically extend the cycling life (>100 cycles vs. 12 cycles) of the cells.

TABLE 2

Comparison of sulfur contents and initial specific capacity of lithium-sulfur cells with different interlayers.

| Interlayer material | Loading of sulfur (mg/cm²) | Loading of interlayer (mg/cm²) | Sulfur content (%) Based on cathode | Based on cathode and interlayer | Initial specific capacity at 0.1 C rate (mAh/g) Based on sulfur | Based on cathode | Based on cathode and interlayer |
|---|---|---|---|---|---|---|---|
| CNTs/$V_2O_5$ | 6 | 0.49 | 70.4 | 66.6 | 1223 | 861 | 814 |
| CNTs | 6 | 0.13 | 70.4 | 69.3 | 991 | 698 | 694 |
| Celgard PP | 6 | 0 | 70.4 | 70.4 | 999 | 703 | 703 |

Figure 14:
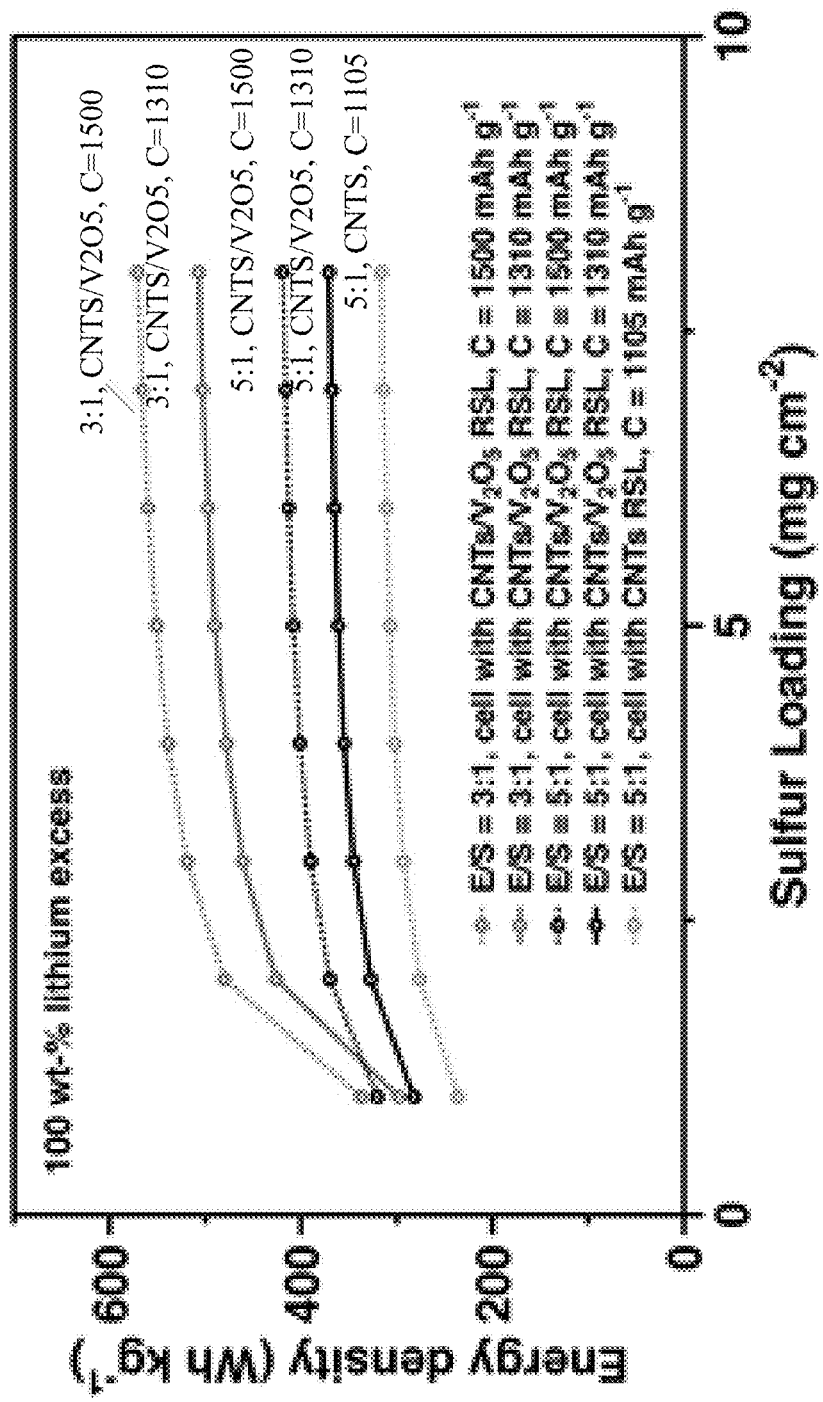
FIG. 14 shows energy densities of Li—S cells with different sulfur loadings, ratios between electrolyte and sulfur (E/S) and specific capacities of active materials. The specific capacity and average working potential of Li—S cells are based on the electrochemical performance of coin cells, while the mass is based on the whole cell, which includes the weights of separator, RSL, sulfur cathode, lithium anode and liquid electrolytes, according to one embodiment of the invention.

To compare current work with literatures, Tables 3A-3B summarize the work published on carbon-coated separators, which are based on physisorption of polysulfides on CNTs, graphene, carbon black, carbon fibers and porous carbons, as well as their composites with non-reactive inorganic moieties such as $Al_2O_3$ and $TiO_2$. In contrast, our work utilizes both physisorption and chemical reaction to block the polysulfides, providing much higher polysulfide scavenging capability. The best-performance Li—S cells reported, which contained a similar sulfur loading of 6.3 mg $cm^{-2}$ and used single-wall CNTs-coated separators, could provide an initial energy density of 214 Wh. $kg^{-1}$ with a capacity fading rate of 0.423% per cycle [19]. With 100 wt-% lithium excess and E/S ratio of 5, the cell with CNTs/$V_2O_5$ RSL delivers a much higher initial energy density of 365 Wh. $kg^{-1}$ with a lower capacity fading rate of 0.303% per cycle, while the ones with CNTs RSL exhibits an energy density of 311 Wh. $kg^{-1}$ with a capacity fading rate of 0.77% per cycle. The comparison clearly distinguishes our work from current state of the art. As shown in FIG. 14, the energy density of Li—S cells increases with higher sulfur loadings, lower ratio between the volume of electrolyte and the mass loading of sulfur (E/S, μL/mg), as well as higher specific capacities of active materials. With further optimization of the ratio of E/S (e.g., E/S=3) and addition of electroactive solvent into the electrolyte, the specific capacity of sulfur may achieve 1500 mAh $g^{-1}$ and the energy density of the cell can possibly reach up to 560 Wh. $kg^{-1}$, which could bring Li—S batteries to practical applications.

TABLES 3A-3B

Comparison of interlayer materials, interaction with $S_n^{2-}$ and maximum sulfur loadings in the literatures and current work [1-22]. The sulfur loadings in Refs. [1]-[4] are not mentioned in the papers and labeled as N/A in the table.

Table 3A

| No. Ref. | Composition of the sulfide blocking layers | | Interactions with $S_n^{2-}$ | Mass loading of sulfur (mg/cm) | Mass loading of interlayer (mg/cm$^2$) | Sulfur content in cathode (%) | Sulfur content in cathode and interlayer |
|---|---|---|---|---|---|---|---|
| 1 | CNT | Multi-wall CNT | Physisorption at surface | N/A | 0.1 | 70 | N/A |
| 6 | | Multi-wall CNT | | 2 | 0.17 | 70 | 66.1 |
| 11 | | Graphene oxide/CNT | | 1.4 | 0.3 | 65 | 57.1 |
| 13 | | CNT/PEG | | 1.6 | 0.26 | 60 | 54.7 |
| 14 | | PANiNF/CNT | | 1.4 | 0.01 | 60 | 59.7 |
| 19 | | Glass fiber/CNT | | 1.6 | 0.54 | 70 | 56.6 |
| 20 | | Self-assembled CNT | | 3 | 1.95 | 80 | 52.6 |
| 22 | | Single-wall CNT | | 1.5 | 0.13 | 75 | 70.4 |
| | | | | 6.3 | 0.13 | 80 | 78.7 |
| 3 | Graphene | Graphene oxide film | | N/A | N/A | 80 | N/A |
| 9 | | Fluorinated reduced graphene oxide | | 2 | 0.35 | 40 | 37.4 |
| 10 | | TiO$_2$/Graphene | | 1.2 | 0.1 | 82 | 76.8 |
| 15 | | Graphene oxide | | 1.5 | 0.12 | 63 | 60.0 |
| 17 | | Reduced graphene oxide | | 1.5 | N/A | 70 | N/A |
| 18 | | Graphene/PP/Al$_2$O$_3$ | | 2.4 | 1.32 | 60 | 45.1 |
| 4 | Carbon black | NaOH activated carbon paper | | N/A | N/A | 60 | N/A |
| 5 | | Super P/Al$_2$O$_3$, Super P/TiO$_2$ | | 2 | N/A | 52.5 | N/A |
| 7 | | Super P | | 1.3 | 0.2 | 60 | 54.9 |
| 12 | | Carbonized PAN/Nation nanofiber | | 1.2 | 4.3 | 65 | 19.5 |
| 2 | Porous carbon | Microporous carbon paper | Physisorption at surface and in pores | N/A | N/A | 70 | N/A |
| 8 | | Microporous carbon | | 2 | 0.15 | 70 | 66.5 |
| 16 | | Mesoporous carbon | | 1.55 | 0.5 | 70 | 57.1 |
| 21 | | Microporous carbon nanofiber | | 2.2 | 0.35 | 70 | 63.0 |
| Current Work | Metal oxides/ CNTs | CNTs/V$_2$O$_5$ RSL | Physisorption and chemisorption/reaction | 2 | 0.49 | 50 | 44.5 |
| | | | | 6 | 0.49 | 70.4 | 66.6 |
| | | | | 6 | 0.49 | 70.4 | 66.6 |

Table 3B

| No. Ref. | Composition of the sulfide blocking layers | | Interactions with $S_n^{2-}$ | Rate (C) | Initial Capacity (mAh/g) | Initial areal capacity (mAh/cm$^2$) | Cycle Number | Capacity fading rate (%/cycle) |
|---|---|---|---|---|---|---|---|---|
| 1 | CNT | Multi-wall CNT | Physisorption at surface | 0.2 | 1446 | N/A | 100 | 6.694 |
| 6 | | Multi-wall CNT | | 1 | 1073 | 2.15 | 300 | 0.19 |
| 11 | | Graphene oxide/CNT | | 1 | 843 | 1.18 | 100 | 0.12 |
| 13 | | CNT/PEG | | 1 | 1250 | 2.00 | 500 | 0.12 |
| 14 | | PANiNF/CNT | | 1 | 1020 | 1.43 | 100 | 0.3 |
| 19 | | Glass fiber/CNT | | 0.2 | 1111.7 | 1.78 | 230 | 0.12 |
| 20 | | Self-assembled CNT | | 0.5 | 851 | 2.55 | 100 | 0.042 |
| 22 | | Single-wall CNT | | 0.2 | 1132 | 1.70 | 300 | 0.18 |
| | | | | 0.2 | 733 | 4.62 | 100 | 0.423 |
| 3 | Graphene | Graphene oxide film | | 0.1 | 1260 | N/A | 100 | 0.29 |
| 9 | | Fluorinated reduced graphene oxide | | 0.1 | 930 | 1.86 | 100 | 0.3 |
| 10 | | TiO$_2$/Graphene | | 2 | 693 | 0.83 | 300 | 0.01 |
| 15 | | Graphene oxide | | 0.1 | 920 | 1.38 | 100 | 0.23 |
| 17 | | Reduced graphene oxide | | 0.2 | 1067 | 1.60 | 100 | 0.18 |
| 18 | | Graphene/PP/Al$_2$O$_3$ | | 0.2 | 1068 | 2.56 | 100 | 0.25 |
| 4 | Carbon black | NaOH activated carbon paper | | 1 | 1240 | N/A | 100 | 0.15 |
| 5 | | Super P/Al$_2$O$_3$, Super P/TiO$_2$ | | 0.5 | 1350 | 2.70 | 200 | 0.09 |
| | | | | 2 | 1045 | 1.36 | 200 | 0.2 |
| 7 | | Super P | | 2 | 1549 | 1.86 | 100 | 0.17 |
| 12 | | CarbonizedPAN/ Nation nanofiber | | 0.2 | 1549 | 1.86 | 100 | 0.17 |

TABLES 3A-3B-continued

Comparison of interlayer materials, interaction with $S_n^{2-}$ and maximum sulfur loadings in the literatures and current work [1-22]. The sulfur loadings in Refs. [1]-[4] are not mentioned in the papers and labeled as N/A in the table.

| 2 | Porous carbon | Microporous carbon paper | Physisorption at surface and in pores | 1 | 1180 | N/A | 150 | 0.15 |
|---|---|---|---|---|---|---|---|---|
| 8 | | Microporous carbon | | 1 | 930 | 1.86 | 500 | 0.08 |
| 16 | | Mesoporous carbon | | 0.2 | 1378 | 2.14 | 500 | 0.081 |
| 21 | | Microporous carbon nanofiber | | 0.2 | 1270 | 2.79 | 20 | 0.13 |
| Current Work | Metal oxides/ CNTs | CNTs/$V_2O_5$ RSL | Physisorption and chemisorption/reaction | 1 | 1068 | 2.14 | 250 | 0.048 |
| | | | | 0.1 | 1308 | 7.85 | 60 | 0.305 |
| | | | | 0.2 | 1155 | 6.93 | 100 | 0.34 |

To quantify the capacity contribution from $V_2O_5$ moieties, cells with lithium as the anode and CNTs/$V_2O_5$ RSL as the cathodes were assembled and tested under similar conditions. It was found that the capacity contribution from the CNTs/$V_2O_5$ RSL is less than 1% of the overall capacity of the Li—S cells in Table 4. Therefore, it is reasonable to conclude that the enhanced performance for the cells with CNTs/$V_2O_5$ RSL is mainly attributed from the polysulfide-scavenging effect and the enhanced conductivity. To further examine the scavenging effect, RSL were equilibrated in $Li_2S_6$ solutions with various concentrations and used as the cathodes. The amount of polysulfides scavenged was then determined electrochemically. It was found that maximum amount of $Li_2S_6$ scavenged by the CNTs RSL and CNTs/$V_2O_5$ RSL is 0.110 mg and 0.486 mg, respectively, as shown in FIG. 15A. Furthermore, the polysulfides scavenged by the RSL could be released and recaptured reversibly upon cycling between 2.8 V to 1.7 V, as shown in FIGS. 15B and 15C. Upon cycling for 10 cycles, the CNTs RSL exhibited significantly capacity decay whereas the CNTs/$V_2O_5$ RSL retains the initial capacity (the amount of polysulfide scavenged), clearly indicating the outstanding scavenging and regenerative capability of the CNTs/$V_2O_5$ RSL.

TABLE 4

Table of capacity contributions from CNTs RSL and CNTs/$V_2O_5$ RSL in Li—S cells with various sulfur loadings at 1 C rate. The capacity of the RSL were determined electrochemically using the RSL as the cathodes and lithium as the anode under the similar testing condition.

| | Sulfur loading | |
|---|---|---|
| | 1 mg cm$^{-2}$ | 2 mg cm$^{-2}$ |
| Capacity of sulfur cathode with CNTs RSL (mAh) | 1.4 | 1.5 |
| Capacity of sulfur cathode with CNTs/$V_2O_5$ RSL (mAh) | 1.6 | 2.3 |
| Capacity of the CNTs RSL (mAh) | 0.011 | 0.01 |
| Capacity of the CNTs/$V_2O_5$ RSL (mAh) | 0.013 | 0.01 |
| Capacity contribution from the CNTs RSL (%) | 0.78% | 0.67% |
| Capacity contribution from the CNTs/$V_2O_5$ RSL (%) | 0.81% | 0.43% |

Besides the improved capacity, cycling stability and rate performance, the use of CNTs/$V_2O_5$ RSL also dramatically reduced the self-discharge rate of Li—S cells. After cycling at 0.2 C rate for 9 cycles, the $10^{th}$ discharge was stopped at 2.1 V, a voltage corresponding to maximized concentration of polysulfides in the cells [40, 41]. Then the discharging process was resumed after 3 days, during which the diffusion of polysulfides could cause self-discharge of the cells. FIGS. 3G and 3H display the charge-discharge voltage vs. capacity for cells without and with the CNTs/$V_2O_5$ RSL before and after the resting. As can be seen here, the cell without the RSL exhibits a discharge capacity of 674 mAh g$^{-1}$ in the $9^{th}$ cycle (denoted as $C_{9th}$), which decreases to 539 mAh g$^{-1}$ after the resting (denoted as $C_{10th}$). On the contrary, the cell with the RSL delivers a much higher capacity of 1174 mAh g$^{-1}$ in the $9^{th}$ cycle ($C_{9th}$), and still maintains the high capacity after the resting (1145 mAh g$^{-1}$, $C_{10th}$). For quantitative analysis, the self-discharge rate of the cells can be estimated by $(C_{9th}-C_{10th})/C_{9th}\cdot 100\%$. Upon incorporating the RSL, the self-discharge rate of the cell was decreased from 26.7% to 2.5%, suggesting the significant role of the CNTs/$V_2O_5$ RSL in blocking diffusion of polysulfides and minimizing the self-discharge rate, which is essential for practical utilization of lithium-sulfur batteries.

SEM study of the scavenging and regeneration process: to further understand the scavenging and regenerating process, distribution of sulfur moieties within the CNTs/$V_2O_5$ RSL at different electrochemical stages was analyzed with SEM and energy dispersive x-ray (EDX) spectroscopy. Li—S cells with CNTs/$V_2O_5$ RSL were cycled at 0.3 C and interrupted at 2.05 V during discharging or 2.60 V during charging, respectively. The CNTs/$V_2O_5$ RSL were then disassembled from the cells and dried in an argon-filled glove box for SEM and EDX studies.

Figure 4B:
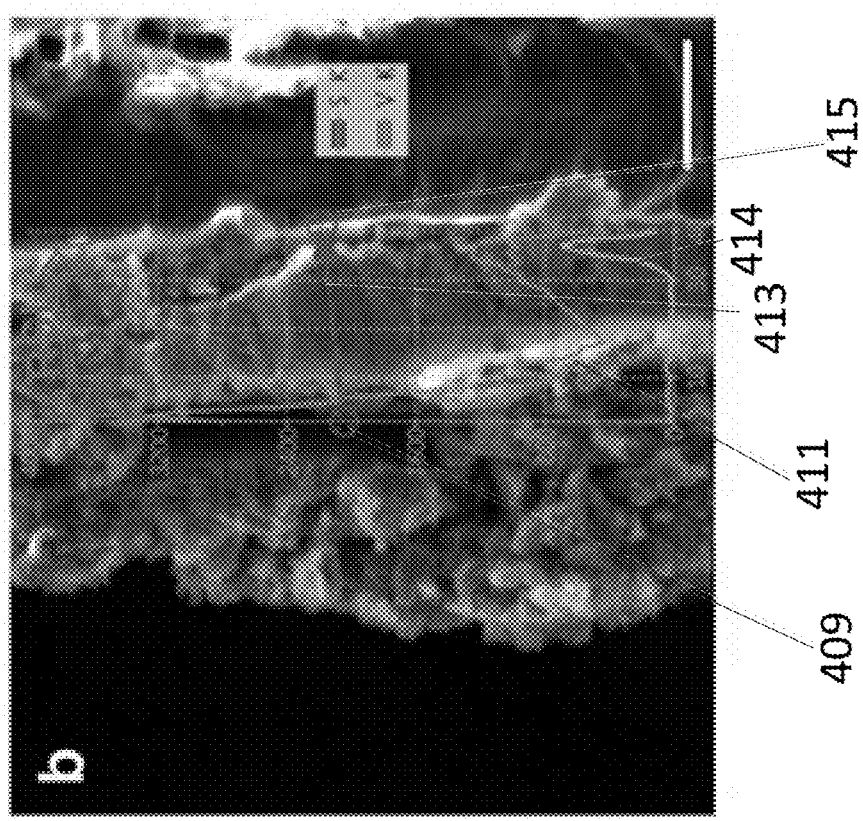
FIGS. 4A-4B show SEM images and element-mapping of CNTs/$V_2O_5$ RSL at discharged and charged stages. Li—S cells were cycled at 0.3 C between 1.7 and 2.8 V, according to one embodiment of the invention.
Figure 4A:
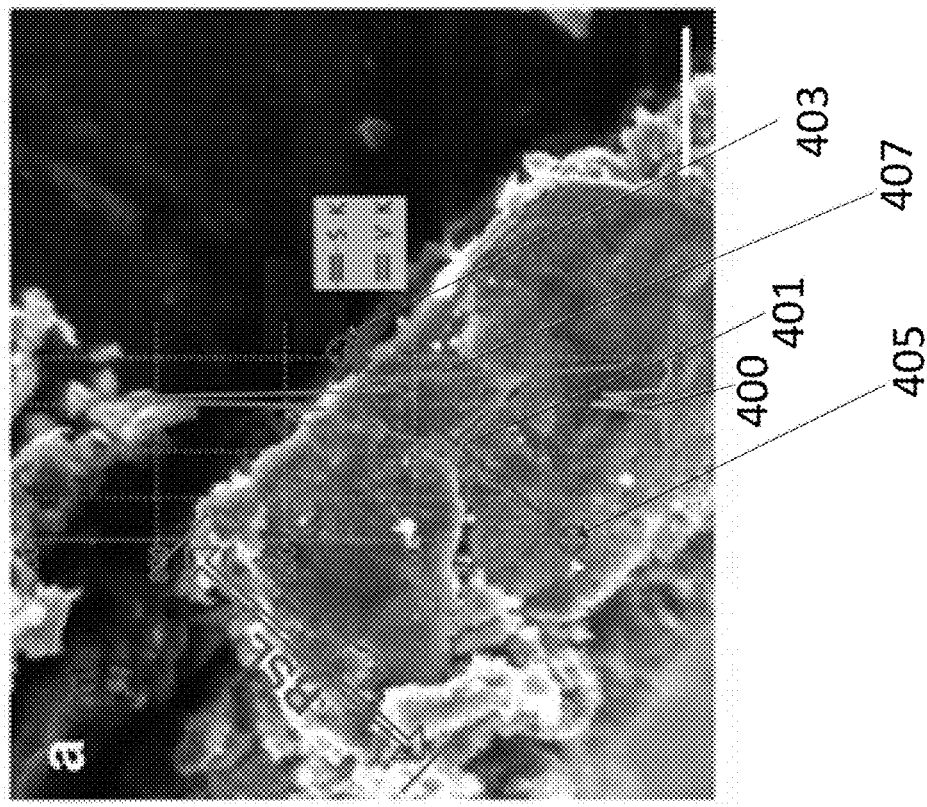

FIGS. 4A-B show SEM images and element-mapping of CNTs/$V_2O_5$ RSL at discharged and charged stages. Li—S cells were cycled at 0.3 C between 1.7 and 2.8 V. FIG. 4A was interrupted at 2.05 V during the discharging and FIG. 4B was interrupted at 2.60 V during the charging. The arrows 401 and 413 from circles 405 to 403 and from the circles 409 to 415 show the direction of the line scan, respectively, while the circles 403, 405, 409 and 415 represent the starting and ending points. Purple line 407 in FIG. 4A and purple line 411 in FIG. 4B represent sulfur and orange line 400 in FIG. 4A and orange line 414 in FIG. 4B represent vanadium. Scale bars are 20 μm for FIG. 4A and 25 μm for FIG. 4B.

Specifically, FIG. 4A displays a cross-section SEM image and the corresponding EDX analysis of the RSL interrupted at 2.05 V. At this electrochemical stage, sulfur is mainly converted to polysulfides located within the electrode and in the electrolyte. EDX analysis shows two peaks associated with sulfur and vanadium co-localized in the center, indicating that the sulfur moieties are distributed dominantly within the $V_2O_5$ layer (less amount of sulfur in the CNTs region). This observation is consistent with the critical role of $V_2O_5$ in scavenging the polysulfides. FIG. 4B presents a cross-section SEM image and the corresponding EDX analysis of the RSL interrupted at 2.60 V. At this electrochemical stage, the scavenged polysulfides are partially stripped away while the RSL is being regenerated. Consistently, EDX analysis also shows two co-localized peaks for sulfur and vanadium but with significantly less amount of sulfur species.

Consequently, the scavenging ability of CNTs/$V_2O_5$ RSL also alleviates the corrosion of lithium anodes during cycling. As shown in FIGS. 16 and 17, the lithium anode from the cell with CNTs RSL exhibits a rough surface with a thick sulfur-containing passivation film (about 300 μm). In comparison, the lithium anode from the cell with CNTs/$V_2O_5$ RSL maintains a smooth surface with a significantly thinner penetration of polysulfides (about 80 μm depth), indicating 73.3% less lithium corrosion.

Reactions between $V_2O_5$ and polysulfides probed by XPS: the scavenging effect is supposed to originate from the chemical-physical adsorption and/or reactions between polysulfides and the CNTs/$V_2O_5$ RSL. To explore the mechanism, $Li_2S_6$ is used as a representative polysulfide species, which was mixed with $V_2O_5$ nanowires. The resulted oxide/sulfide solid was isolated and investigated using XPS analysis.

Figures 5A, 5C:
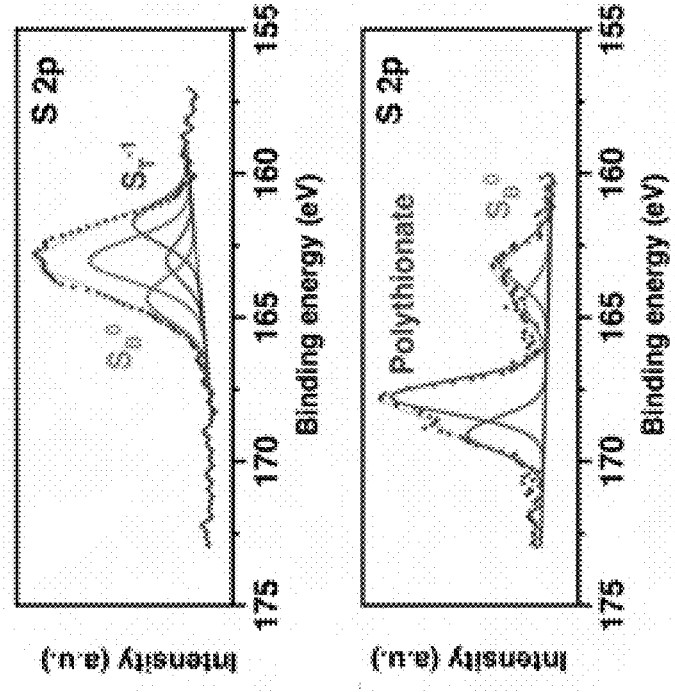
FIGS. 5A-5D show reactions between $V_2O_5$ and polysulfides probed by x-ray photoelectron spectroscopy (XPS), according to one embodiment of the invention.
Figures 5B, 5D:
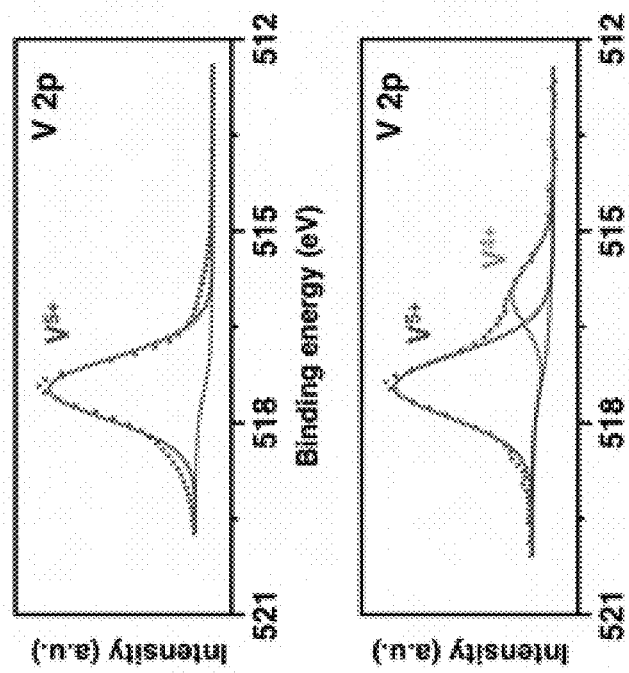

FIGS. 5A-5D show reactions between $V_2O_5$ and polysulfides probed by XPS. FIG. 5A shows Vanadium $2p_{3/2}$ spectra of $V_2O_5$. FIG. 5B shows $V_2O_5$/sulfide compound formed by reacting $V_2O_5$ with $Li_2S_6$, indicating the formation of $V^{4+}$ in the presence of $Li_2S_6$. FIG. 5C shows sulfur 2p core spectra of $Li_2S_6$ showing the terminal ($S_T^{-1}$) and bridging ($S_B^0$) sulfur atoms with an expected ratio of 1:2. FIG. 5D shows sulfur 2p core spectra of the $V_2O_5$/sulfide compound. The formation of polythionate groups indicates redox reactions between $Li_2S_6$ and $V_2O_5$.

Specifically, XPS spectra of $V_2O_5$ before and after mixing with $Li_2S_6$ are presented in FIGS. 5A and 5B, respectively. $V_2O_5$ displays a typical $2p_{3/2}$ spectrum for the $V^{5+}$ state at 517.5 eV. After the mixing, the $2p_{3/2}$ peak splits into two peaks centered at 517.5 eV and 516.0 eV, which are originated from the $V^{5+}$ and $V^{4+}$ states, respectively [42]. FIGS. 5C and 5D further compare the sulfur 2p core spectra of $Li_2S_6$ and oxide/sulfur solid. $Li_2S_6$ exhibits two sulfur states at 163.0 eV and 161.7 eV, which can be assigned to bridging ($S_B^0$) and terminal ($S_T^{-1}$) sulfur atoms in polysulfide anions, respectively [6, 43, 44]. The ratio between $S_B^0$ and $S_T^{-1}$ is around 2:1, which is in accordance with the composition of $Li_2S_6$. In contrast, the S 2p spectrum of the oxide/sulfide solid illustrates two sulfur states, which can be attributed to $S_B^0$ at 163.2 eV and polythionate complex at 167.9 eV, respectively [43]. The formation of $V^{4+}$ and the polythionate complex suggests the occurrence of redox reactions between $Li_2S_6$ and $V_2O_5$, forming Li—V—O—S complexes. Meanwhile, the terminal sulfur atoms ($S_T^{-1}$) were not detected in the oxide/sulfide solid, suggesting that the $Li^+$ ions, which were paired with the polysulfides, are intercalated or inserted into $V_2O_5$.

Based on the studies presented above, a possible mechanism can be constructed: during discharging, soluble polysulfides are continuously generated in the cathode and tend to diffuse toward the anode. With the incorporation of CNTs/$V_2O_5$ RSL, polysulfides are adsorbed and oxidized by the embedded oxide, forming solid-state [Polysulfides-RSL] complex and being immobilized. In the subsequent charging/delithiation process, lithium ions and polysulfides are stripped away from the RSL and re-deposited onto the electrodes, respectively. Through such a dynamic and regenerative process, the shuttling effect of polysulfides can be effectively mitigated, leading to Li—S batteries with significantly improved electrochemical performance.

Figure 6A:
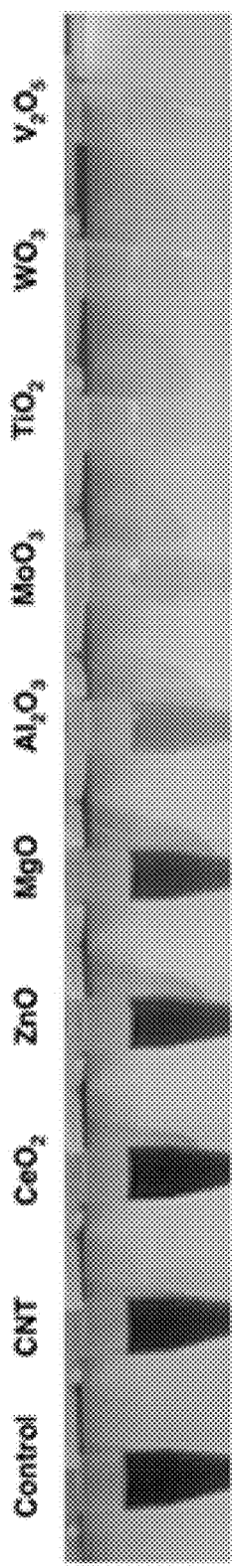
FIGS. 6A-6D shows correlations between cell performance, work function of oxide moieties and bond energy between the oxides and polysulfides, according to one embodiment of the invention. FIG. A, Photographs of $Li_2S_6$ solutions mixed with metal oxides after centrifugation. FIG. B, Absolute potentials of the conduction bands and valence bands of various metal oxides, as well as the oxidation potential of polysulfides (2.2 to 2.5 V vs. Li$^+$/Li, labeled in purple). FIG. C, Work functions of a series metal oxides. FIG. D, A comparison of the bond energies between the metal oxides and polysulfides (Light green) with the specific capacity of the corresponding Li—S cells after 100 cycles at 1 C (Green). These cells were made using RSL containing these metal oxides, respectively. The bond energies were calculated with Flore's equation based on dissociation energy, electronegativity and chemical hardness of metal oxides and polysulfides.
Figure 6B:
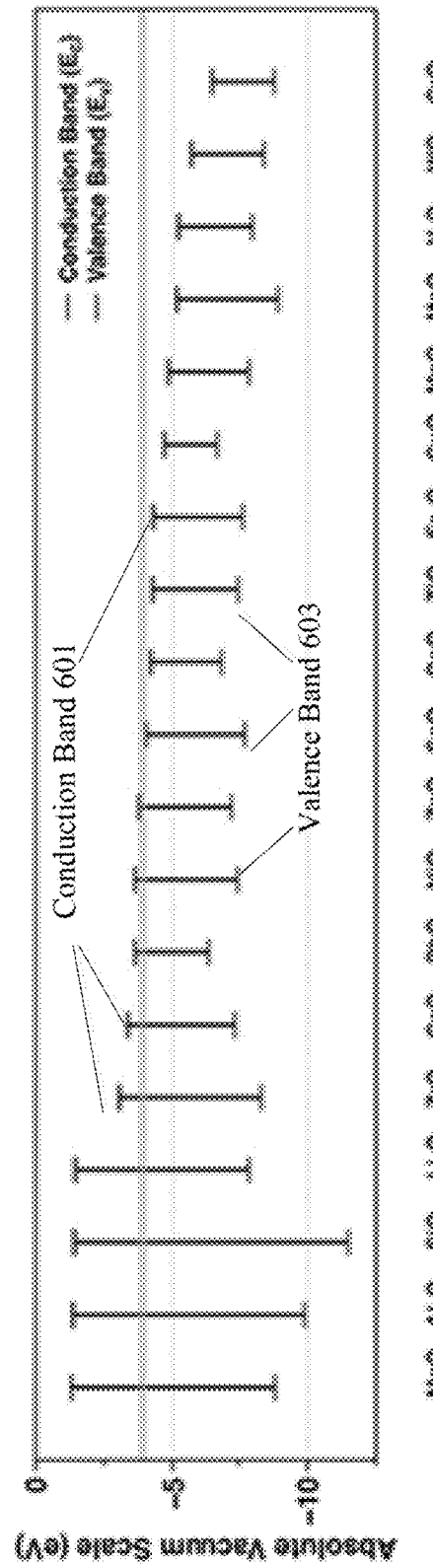
Figure 6C:
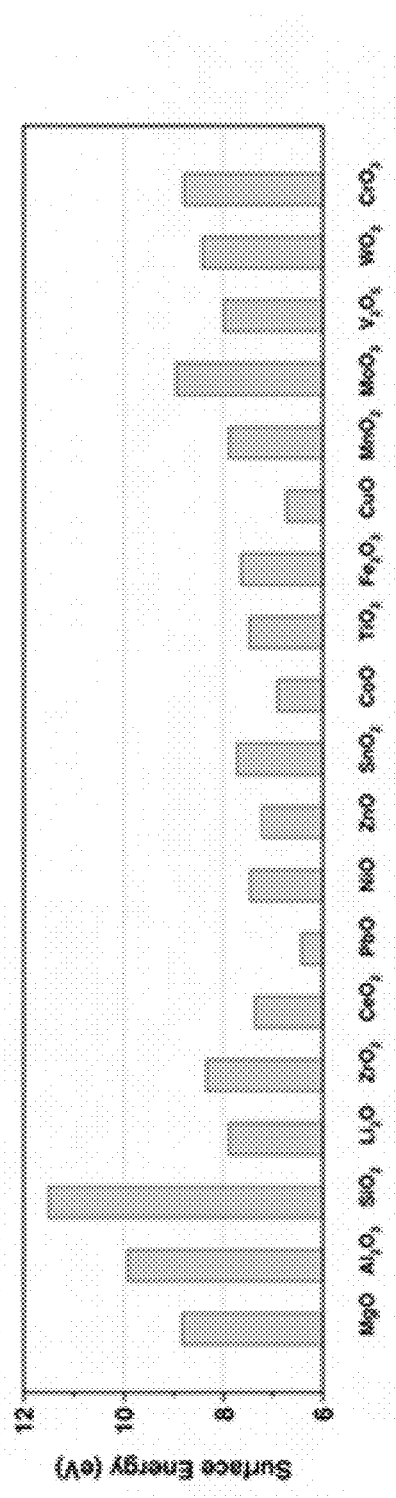
Figure 6D:
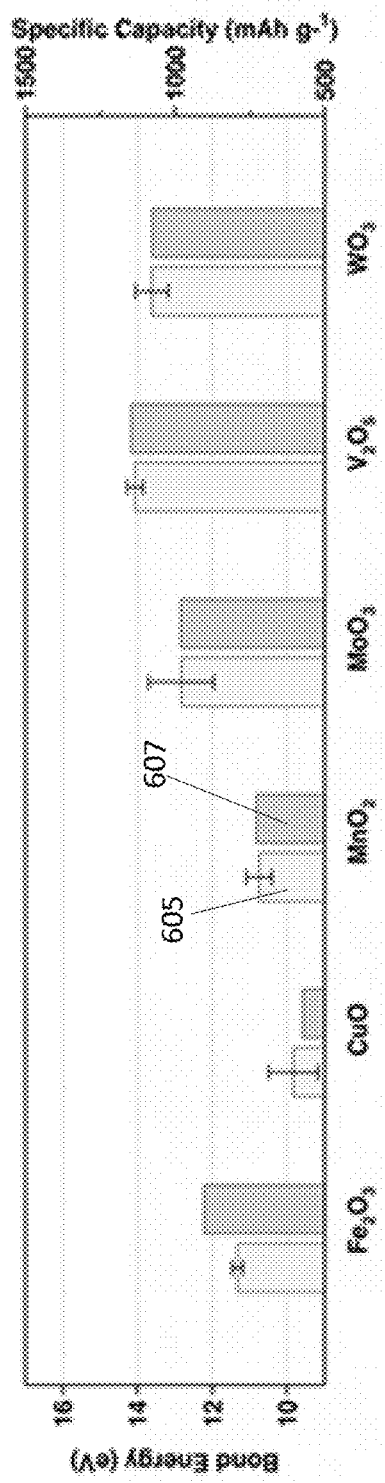

FIGS. 6A-6D show correlations between cell performance, work function of oxide moieties and bond energy between the oxides and polysulfides. FIG. 6A shows photographs of $Li_2S_6$ solutions mixed with metal oxides after centrifugation. FIG. 6B shows absolute potentials of the conduction bands 601 and valence bands 603 of various metal oxides, as well as the oxidation potential of polysulfides (2.2 to 2.5 V vs. $Li^+$/Li, labeled in purple). FIG. 6C shows work functions of series metal oxides. FIG. 6D shows a comparison of the bond energies between the metal oxides and polysulfides (Light green 605 on the left) with the specific capacity of the corresponding Li—S cells after 100 cycles at 1 C (Green 607 on the right). These cells were made using RSL containing these metal oxides, respectively. The bond energies were calculated with Flore's equation based on dissociation energy, electronegativity and chemical hardness of metal oxides and polysulfides.

Thermodynamically, adsorption occurs spontaneously between solid-gas and solid-liquid interfaces to balance the chemical potentials between the interfaces. In this regard, a series of metal oxides with distinct electronic structures were mixed with $Li_2S_6$ solutions and then centrifuged, as shown in the digital photographs in FIG. 6A. The $Li_2S_6$ solution (control) exhibits a dark brown color, while the mixtures containing CNTs, $CeO_2$, ZnO, MgO, $Al_2O_3$, $MoO_3$, $TiO_2$, $WO_3$, or $V_2O_5$ show increasingly lighter color, indicating an increasing degree of adsorption or reaction of the sulfides with oxides. This observation suggests that various oxides could be used as the blocking moieties for RSL fabrication.

Figure 18:
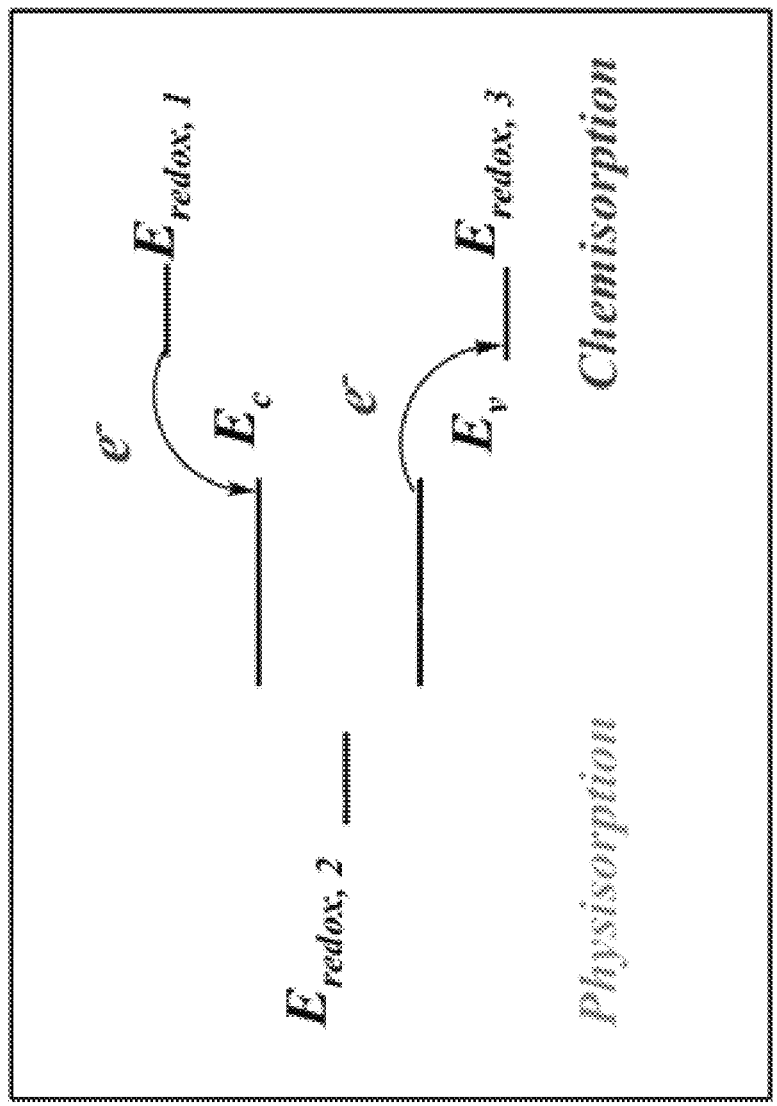
FIG. 18 shows electron transfer directions regarding the relative positions of conduction bands and valence bands of the oxides and redox potential of the molecule, according to one embodiment of the invention.

To understand the adsorption and chemical reaction of polysulfides with the RSL, FIG. 6B compares the redox potentials of polysulfides ($E_{redox}$) with the conduction bands ($E_c$) of commonly used metal oxides [45-48]. For Li—S batteries, the redox potentials of polysulfides exist in the range from 2.2 to 2.5 V (vs. $Li^+$/Li) depending on their compositions [40], which is marked in FIG. 6B. When the redox potential of the polysulfides is above the conduction bands of the oxide, electrons from the polysulfides can be transferred to the oxides, resulting in chemisorption with chemical-bond formations, as shown in FIG. 18. Based on the relative position of the conduction bands, such oxides can be categorized into two groups: one group that can physically adsorb polysulfides without electron transfer (physisorption) including MgO, $Al_2O_3$, $SiO_2$, $Li_2O$, $CeO_2$, PbO, NiO and ZnO; the other group that can react with polysulfides (chemisorption) including $SnO_2$, CoO, $TiO_2$, $Fe_2O_3$, CuO, $MnO_2$, $MoO_3$, $V_2O_5$, $WO_3$, and $CrO_3$.

Figure 19:
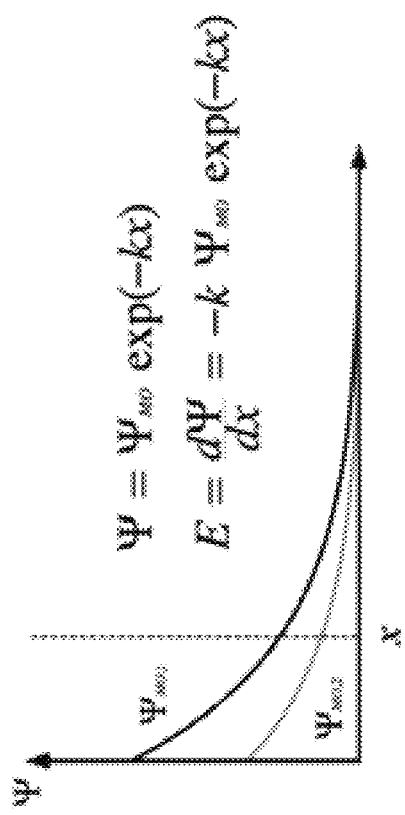
FIG. 19 shows the interaction in physisorption and chemisorption, according to one embodiment of the invention.

For physisorption, the adsorption is mainly governed by work function (or surface energy, which is proportional to surface potential) of the oxides. An oxide with higher surface potential my build up a stronger electric field within its Debye length, resulting in a stronger adsorption of the adsorbates [49], as shown in FIG. 19. FIG. 6C displays the work functions of a series of oxides [47], which can be used as an indicator for adsorption ability or polysulfide-scavenging capability. Comparing with MgO, $CeO_2$ and ZnO, $Al_2O_3$ has the highest work function and the best polysulfide-scavenging performance as observed in the visual experiment, in which the $Li_2S_6$ solutions with MgO, $CeO_2$ or ZnO remain brownish while that with $Al_2O_3$ shows light yellow color.

Figure 20:
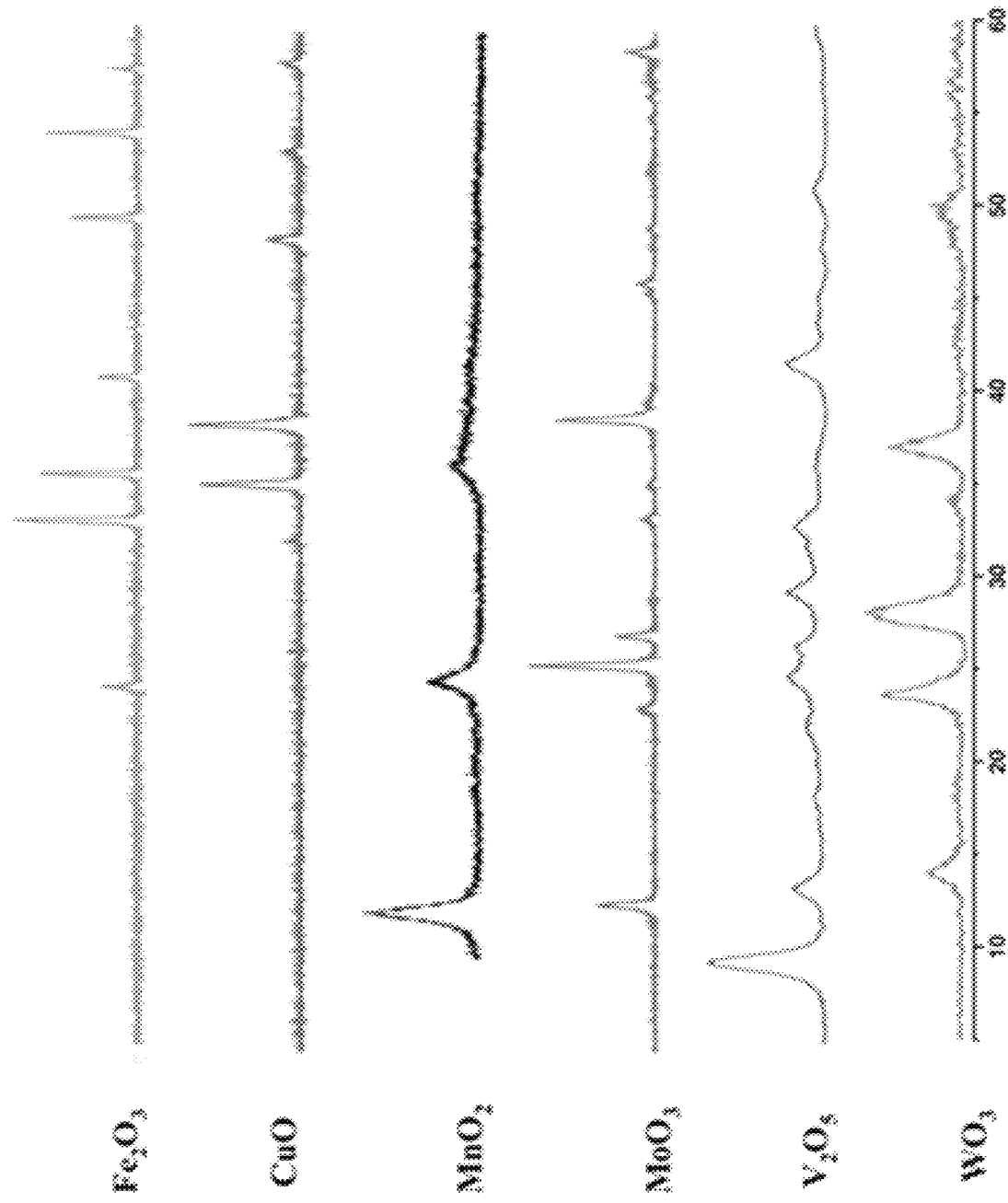
FIG. 20 shows X-ray diffraction (XRD) plots of CNTs/oxide composites used in the RSL, according to one embodiment of the invention.

In terms of the oxides with $E_c$ lower than $E_{redox}$, chemisorption occurs, where the color of the $Li_2S_6$ solutions diminished immediately upon contacting with the oxides ($MoO_3$, $TiO_2$, $WO_3$ and $V_2O_5$). Generally, the bond energy between adsorbents and adsorbates is related to their dissociation energy [50], electronegativity and chemical hardness [47], which can be calculated with Flore's equation [51]. It is reasonable to hypothesize that stronger bond energy between an oxide and the polysulfides should lead to better scavenging or blocking effect. To examine such hypothesis, a series of CNTs/oxide RSL were fabricated using CNTs and different oxides, as shown in FIG. 20, and their polysulfide-scavenging capability was evaluated. FIG. 6D presents their bond energies with polysulfides, as well as capacities of Li—S cells with such RSL after 100 cycles at 1 C. As shown here, there is a significant correlation between bond energy and cycling stability: stronger bond energies between the oxides and polysulfides lead to higher capacity retentions and lower self-discharge rate, as shown in FIG. 20. For example, $WO_3$ and polysulfides exhibit high bond energy of 13.62 eV, leading to cells with a high capacity of 1075 mAh $g^{-1}$ and a near-zero self-discharge rate. CuO and polysulfides show lower bond energy of 9.83 eV, as expected, resulting in lower capacity retention of 572.9 mAh $g^{-1}$ and about 9.0% of self-discharge rate. This observation suggests that it is possible to use the bond energy between the scavenging materials and polysulfides to evaluate or predict their polysulfide-scavenging capability, providing a quantified guidance for Li—S batteries.

In terms of the oxides with $E_c$ lower than $E_{redox}$, chemisorption occurs, where the color of the $Li_2S_6$ solutions diminished immediately upon contacting with the oxides ($MoO_3$, $TiO_2$, $WO_3$ and $V_2O_5$). Generally, the bond energy adsorbents and adsorbates is related to their dissociation energy [50], electronegativity and chemical hardness [47], which can be calculated with Flore's equation [51]. It is reasonable to hypothesize that stronger bond energy between an oxide and the polysulfides should lead to better scavenging or blocking effect. To examine such hypothesis, a series of CNTs/oxide RSL were fabricated using CNTs and different oxides, as shown in the XRD of FIG. 19, and their polysulfide-scavenging capability was evaluated. FIG. 6D presents their bond energies with polysulfides, as well as capacities of Li—S cells with such RSL after 100 cycles at 1 C. As shown here, there is a significant correlation between bond energy and cycling stability: stronger bond energies between the oxides and polysulfides tend to result in higher capacity retentions and lower self-discharge rate, as shown in FIG. 20. For example, $WO_3$ and polysulfides exhibit high bond energy of 13.62 eV, leading to cells with a high capacity of 1075 mAh $g^{-1}$ and a near-zero self-discharge rate. CuO and polysulfides show lower bond energy of 9.83 eV, as expected, resulting in lower capacity retention of 572.9 mAh $g^{-1}$ and about 9.0% of self-discharge rate. This observation suggests that it is possible to use the bond energy between the scavenging materials and polysulfides to evaluate or predict their polysulfide-scavenging capability, providing a quantified guidance for Li—S batteries.

FIG. 7 shows the RSL with scavenging capability for polysulfides and regenerative ability. In FIG. 7, the RSL are made from two CNTs layers and a sandwiched CNTs/metal oxides layer.

In summary, a class of RSL is developed based on CNTs and oxides with low-dimension forms, which can dynamically block the diffusion of polysulfides and regenerate themselves during cycling. Li—S batteries with CNTs/$V_2O_5$ RSL exhibit high areal capacity of >6 mAh $cm^{-2}$ for 60 cycles, dramatically extended cycling life (>100 cycles vs. 12 cycles), low self-discharge rate of 2.45% after resting for 3 days and about 73.3% less lithium corrosion. With further optimization, energy density of the cell with RSL can possibly reach up to 560 Wh. $kg^{-1}$, which could bring Li—S batteries to practical applications. Rooting from the electronic structure of the oxides and the redox potentials of polysulfides, the scavenging capability of the oxides is thoroughly investigated and correlated with the electrochemical performance of Li—S cells. This work not only offers a class of polysulfide-scavenging layers to effectively address the shuttling effect, but also provides quantified design framework towards Li—S batteries with high energy density and prolonged cycling life, which brings them one step closer to practical applications.

Synthesis of CNTs/oxide composites: CNTs/$V_2O_5$ composites were synthesized with activated CNTs according to the previously reported procedure [37]. Briefly, 0.6 g of ammonium metavanadate (Sigma-Aldrich) and 1 g of P123 ($EO_{20}PO_{70}EO_{20}$) (Sigma-Aldrich) were dispersed in 60 mL deionized water with 3 mL 2 M HCl. 20 mg activated CNTs was added to the mixture and sonicated for 30 min. The mixture was stirred at room temperature for 12 hours and then transferred to an autoclave and heated at 120° C. for 24 h. The resulted composites were rinsed with deionized (DI) water and ethanol for 3 times, and dried at 80° C. overnight in vacuum. Other CNTs composites containing different metal oxides were synthesized using similar hydrothermal methods.

Fabrication of RSL: the RSL were prepared using a vacuum-filtration method. CNTs and CNTs/metal oxides composites were dispersed in ethanol by sonication and formed 0.1 mg $mL^{-1}$ and 1 mg $mL^{-1}$ suspensions, separately. Subsequently, 20 mL CNT suspension, 6 mL suspension of CNTs/metal oxides composites and 20 mL CNT suspension were vacuum filtered through a polypropylene membrane (Celgard 2500, diameter: 47 mm) and form a flexible triple layer membrane. The membranes were dried at 70° C. overnight and then punched into a round shape with a diameter of 18 mm. The weight of the RSL on each separator is around 0.4-0.6 mg $cm^{-2}$ in Table. For CNTs RSL, 100 mL CNT suspension was filtrated.

Preparation of sulfur cathodes and $Li_2S_6$ solution: sulfur cathodes were prepared using a slurry casting method. For electrodes with low sulfur loading (1-2 mg $cm^{-2}$), sulfur, carbon black and polyvinylidene fluoride (PVDF) were mixed with weight ratio of 5:4:1 to form a homogenous slurry with N-methyl-2-pyrrolidone, then casted onto a carbon-coated aluminum foil with a doctor blade. For electrodes with higher sulfur loading (up to 6 mg $cm^{-2}$), carbon/sulfur composites, carbon nanofiber, carbon black and PVDF were mixed with weight ratio of 88:4:1:7 to form a slurry. Porous carbon particles were fabricated using Kejent black [52] and the carbon/sulfur composites were prepared using liquid infiltration method at 159° C. with a weight ratio of 1:4. The electrodes were dried at 70° C. in vacuum for 4 hours and then cut into pieces with a diameter of 16 mm. 0.5 M $Li_2S_6$ solution was prepared by mixing stoichiometric amounts of elemental sulfur (Sigma Aldrich) and $Li_2S$ (Alfa Aesar) in DOL:DME (volume ratio 1:1). A homogenous dark-red solution of $Li_2S_6$ was obtained after stirring for 24 hours at 130° C.

Electrochemical measurements: to evaluate the electrochemical performance, 2032-type coin cells (MTI Corporation) were assembled using lithium metal as the anodes. RSL were placed between polypropylene separator and sulfur cathode. 0.5 M LiTFSI and 2 wt-% $LiNO_3$ in DOL/DME was used as electrolyte. CV measurements were performed on a Bio-Logic VMP3 electrochemical workstation. Galvanostatic charge-discharge measurements were carried out using Land CT2000 battery tester in a voltage range of 1.7-2.8 V for all rates. Specific capacities were calculated with respect to the mass of sulfur. EIS tests were carried out on a Solartron 1860/1287 electrochemical interface.

Material characterizations: XRD measurements were performed on Rigaku MiniFlex instrument using the copper Kα radiation (λ=1.54 Å). TGA was performed on a TA Instrument SDT Q600 employing a heating rate of 5° C. min$^{-1}$ from 40° C. to 600° C. under airflow. SEM studies were conducted on a JEOL JSM-6700 FE-SEM and TEM studies were carried out on a FEI T12 operating at 120 kV. For XPS studies, the samples were sealed in a transporter in the glove box before being quickly transferred to the high-vacuum chamber of XPS (AXIS Ultra DLD) for analysis. All the spectra were fitted to Gaussian-Lorentzian functions and a Shirley-type background using CasaXPS software. The binding energy values were all calibrated using C 1 s peak at 285.0 eV.

Without intent to limit the scope of the invention, examples and their related results according to the embodiments of the present invention are given below. These examples, however, should not in any sense be interpreted as limiting the scope of the present invention.

Example 1

In this exemplary example, regenerative polysulfide-scavenging layers enabling lithium-sulfur batteries with high energy density and prolonged cycling life are shown. CNTs composites with different metal oxides are synthesized as follows.

Preparation of CNTs/$Fe_2O_3$ composite: 1.25 g $FeSO_4 \cdot 7H_2O$, 5 mL of polyethylene glycol 20,000 solution (50 g L$^{-1}$) and 20 mg activated CNTs were dispersed in 42.5 mL DI water by sonication. 5 mL of diluted ammonia (2.5 wt %) and 0.135 mL $H_2O_2$ (28-30 wt %) were added into the above mixture under stirring. The mixture was then stirred for 1 hour at room temperature and underwent hydrothermal reaction at 160° C. for 8 h. After cooling to room temperature, as-formed composites were filtered, washed with distilled water, and dried at 60° C. overnight in vacuum.

Preparation of CNTs/CuO composite: 0.94 g copper nitrate (Sigma-Aldrich), 1 g of P123 and 20 mg active CNTs were dispersed in 40 mL DI water by sonication. Then, 10 mL of ammonium hydroxide solution (27-30 wt %) was added. The mixture was then stirred for 1 h at room temperature, and then underwent hydrothermal reaction at 110° C. for 4 h. As-formed product was rinsed with deionized water and ethanol for 3 times and dried at 80° C. overnight in vacuum. The product was further calcinated in nitrogen at 300° C. for 2 h.

Preparation of CNTs/$MnO_2$ composite: 0.72 g $KMnO_4$ and 20 mg active CNTs were dispersed in 60 mL of deionized water by sonication. The mixture underwent hydrothermal reaction at 100° C. for 24 h. The products were rinsed with deionized water for 3 times and then dried at 80° C. overnight in vacuum.

Preparation of CNTs/$MoO_3$ composite: 1 gram (g) ammonium heptamolybdate tetrahydrate and 1 gram of P123 and 40 mg active CNTs were dispersed in 33 mL of deionized water by sonication. Then, 6 mL $HNO_3$ was added and allowed to react at 180° C. for 24 h. The products were rinsed with deionized water for 3 times and then dried at 80° C. overnight in vacuum.

Preparation of CNTs/$WO_3$ composite: 0.5 g of sodium tungstate, 0.25 g of ammonium sulfate (Sigma-Aldrich) and 20 mg activated CNTs were dispersed in 10 mL of deionized water by sonication. The pH of the solution was then adjusted to 1 by adding 3 M $H_2SO_4$ aqueous solution. The mixture underwent hydrothermal reaction at 100° C. for 12 h. The products were rinsed with deionized water for 3 times and then dried at 80° C. overnight in vacuum.

Figure 8:
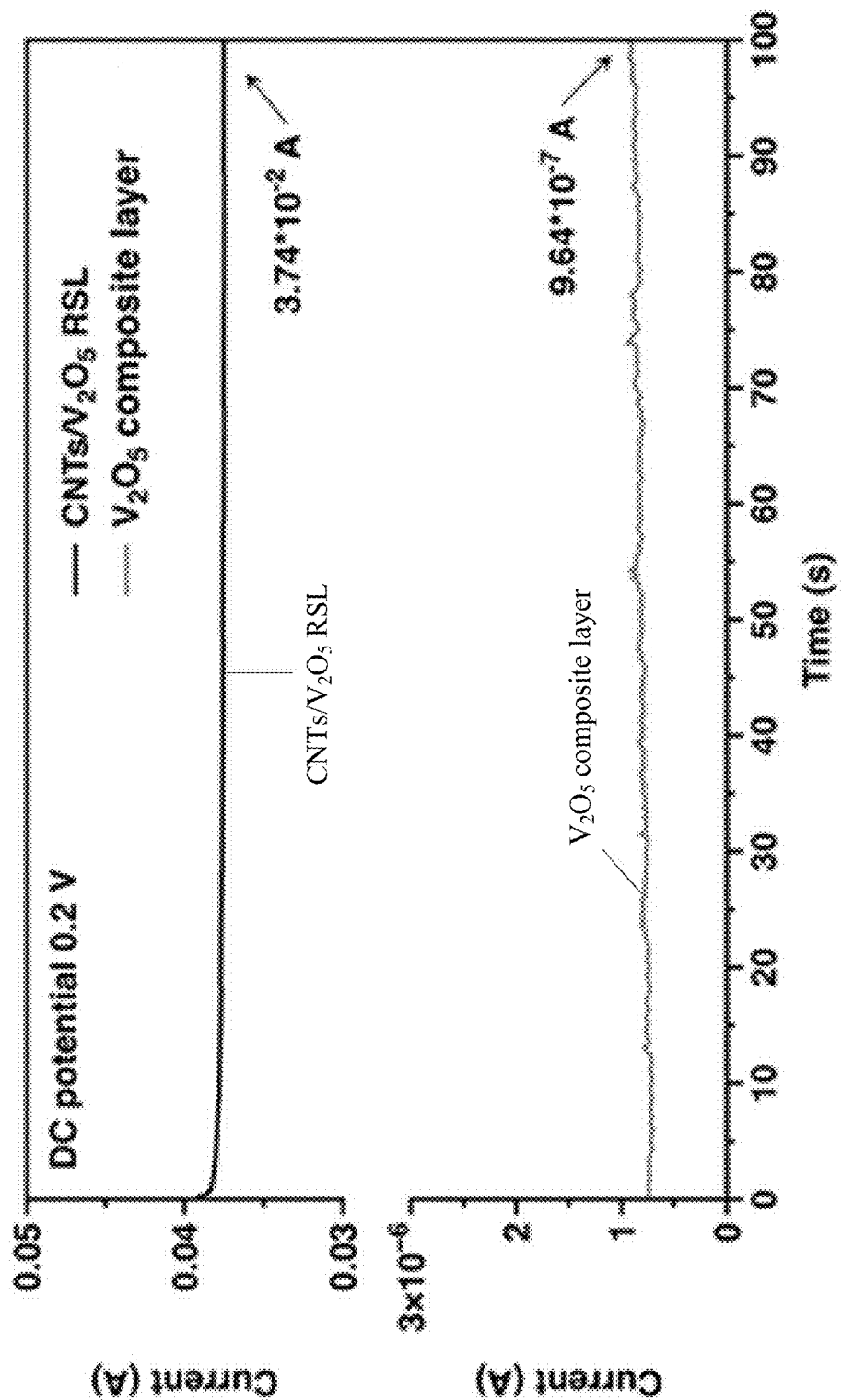
FIG. 8 shows direct-current polarization profile of a CNTs/$V_2O_5$ RSL and a $V_2O_5$ composite layer (with same area) at 0.2 V, showing that the conductivity of the $V_2O_5$ composite layer (without extra CNTs layers) is 4 magnitudes lower than that of the CNTs/$V_2O_5$ RSL, according to one embodiment of the invention. Such significant difference in conductivity is due to their fabrication method. To prepare the CNTs/$V_2O_5$ RSL, dispersions of CNTs, $V_2O_5$ composite, and CNTs were sequentially filtrated onto a porous separator, during which the CNTs and the CNTs from the $V_2O_5$ composite can effectively entangled forming effectively conductive networks. In contrast, only $V_2O_5$ composite dispersion was filtrated to form the $V_2O_5$ composite layer, resulting in significantly lower electronic conductivity because of less amount of CNTs present and less effective conductive network.

FIG. 8 shows direct-current polarization profile of a CNTs/$V_2O_5$ RSL and a $V_2O_5$ composite layer (with same area) at 0.2 V. The direct-current polarization profile shows that the conductivity of the $V_2O_5$ composite layer (without extra CNTs layers) is 4 magnitudes lower than that of the CNTs/$V_2O_5$ RSL. Such significant difference in conductivity is due to their fabrication method. To prepare the CNTs/$V_2O_5$ RSL, dispersions of CNTs, $V_2O_5$ composite, and CNTs were sequentially filtrated onto a porous separator, during which the CNTs and the CNTs from the $V_2O_5$ composite can effectively entangled forming effectively conductive networks. In contrast, only $V_2O_5$ composite dispersion was filtrated to form the $V_2O_5$ composite layer, resulting in significantly lower electronic conductivity because of less amount of CNTs present and less effective conductive network.

FIG. 9 shows TGA plot of the CNT/$V_2O_5$ composites indicating that the composites contain about 9.8% of CNT.

Figure 10:
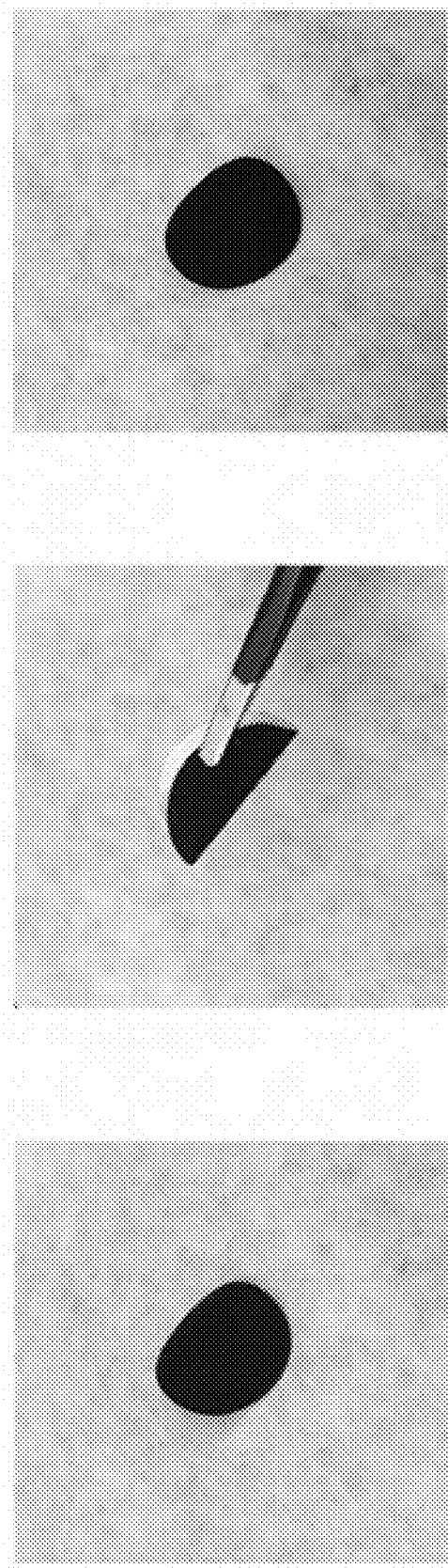
FIGS. 10A-10C show digital photographs of CNTs/$V_2O_5$ RSL.

FIGS. 10A-10C show digital photographs of CNTs/$V_2O_5$ RSL: FIG. 10(A) as-prepared, FIG. 10(B) folded and FIG. 10(C) recovered states.

Example 2

FIG. 11 shows galvanostatic cycling performance of the cells with Celgard PP separator, with CNTs (2) RSL or CNTs/$V_2O_5$ RSL. All cells were cycled at 0.3 C rate for 3 cycles and then 1 C rate for 250 cycles. As shown in FIG. 11, for each of the cells with Celgard PP separator, with CNTs (2) RSL and CNTs/$V_2O_5$ RSL, specific capacity decreases as the cycle number increases. With the same cycle numbers, specific capacity for cell with CNTs (2) RSL is lower than that of cells with CNTs/$V_2O_5$ RSL, but higher than that of the cells with Celgard PP separator.

FIG. 12 shows capacity retention of the cells made with CNTs/$V_2O_5$ RSL prepared with different CNTs/$V_2O_5$ mass ratios but a fixed composite mass. As shown in FIG. 12, for each of the cells with ratios 1:1.33, 1:1.17 and 1:0.92 of CNTs/$V_2O_5$ RSL, specific capacity decreases as the cycle number increases. When the cycle number is larger than 0, with the same cycle numbers, specific capacity for the cells with a ratio 1:1.17 of CNTs/$V_2O_5$ RSL is lower than that of cells with a ratio of 1:1.33 of CNTs/$V_2O_5$, but higher than that of the cells with a ratio of 1:0.92 of CNTs/$V_2O_5$.

FIG. 13 shows galvanostatic cycling performance of Li—S batteries with Celgard PP separator, CNTs RSL, CNTs/$V_2O_5$ RSL, and $V_2O_5$ composite layer at 0.3 C rate. The CNTs/$V_2O_5$ RSL shows better capacity performance than CNTs RSL due to the regenerative scavengers, and CNTs RSL shows better performance than the Celgard PP separator due to its ability to adsorb and desorb polysulfides. In sharp contrast, the $V_2O_5$ composite layer can effectively scavenge the polysulfides, however, because of its poor conductivity, as-scavenged polysulfides could not be released back during the charging process. Such an un-regenerative process trapped polysulfides continuously within the composite, resulting in continuous decay of the capacity.

FIG. 14 shows energy densities of Li—S cells with different sulfur loadings, ratios between electrolyte and sulfur (E/S) and specific capacities of active materials. The specific capacity and average working potential of Li—S cells are based on the electrochemical performance of coin cells, while the mass is based on the whole cell, which includes the weights of separator, RSL, sulfur cathode, lithium anode and liquid electrolytes.

FIGS. 15A-15C show scavenging capacitance of the CNTs and CNTs/$V_2O_5$ RSL at different $Li_2S_6$ concentrations. FIGS. 15B and 15C show cyclic voltammetries of the equilibrated CNTs RSL and CNTs/$V_2O_5$ RSL cathodes at a scanning rate of 0.05 mV s$^{-1}$, respectively. Referring to FIGS. 15B and 15C, CNTs and CNTs/$V_2O_5$ RSL were equilibrated in $Li_2S_6$ solutions with various concentrations, respectively. After wiping off the residual solution on the surface, cells were assembled using the equilibrated RSL as the cathode and lithium metal as the anode. Both cells exhibit an open circuit voltage (OCV) of about 2.36 V, which is the same as the redox potential of the polysulfides. The cells were then hold at 2.8 V till the current reached 1 µA, during which the Li$^+$ from the adsorbed polysulfides were stripped off from the RSL. The total charges were measured and converted to the amount of $Li_2S_6$ adsorbed on the RSL.

Figure 16A:
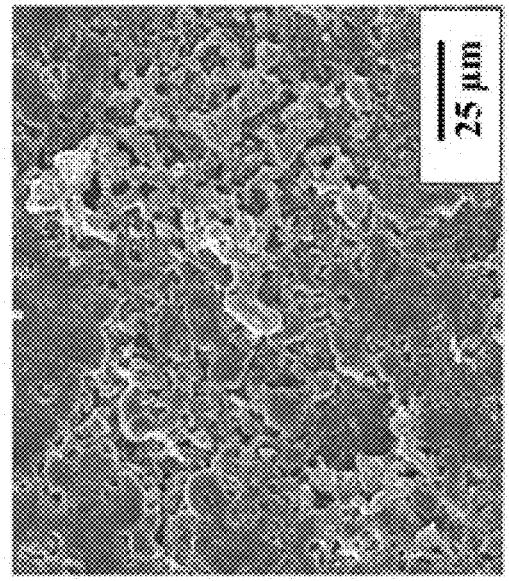
FIGS. 16A-16D show SEM images of a lithium surface after cycling at 1 C for 50 cycles FIG. 16(A) and FIG. 16(B) Li—S cell with CNTs (1) RSL, and FIG. 16(C) and FIG. 16(D) Li—S cell with CNTs/V$_2$O$_5$ RSL, according to one embodiment of the invention.
Figure 16B:
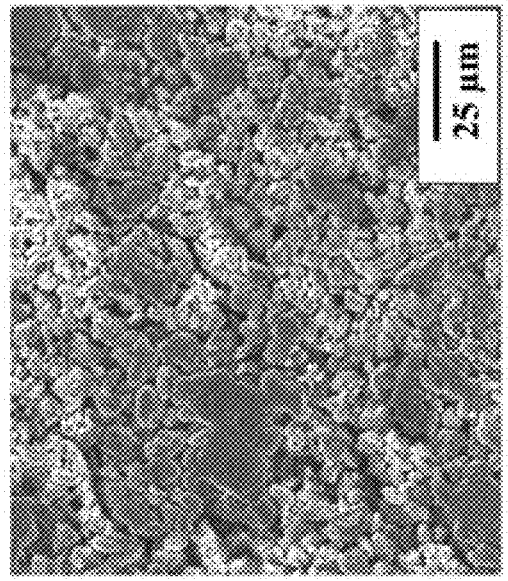
Figure 16C:
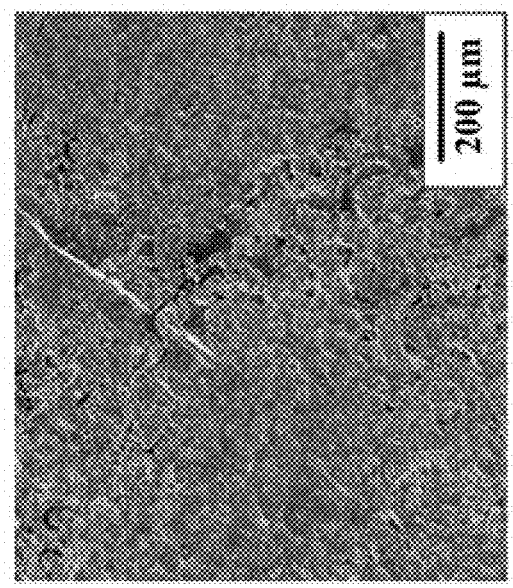
Figure 16D:
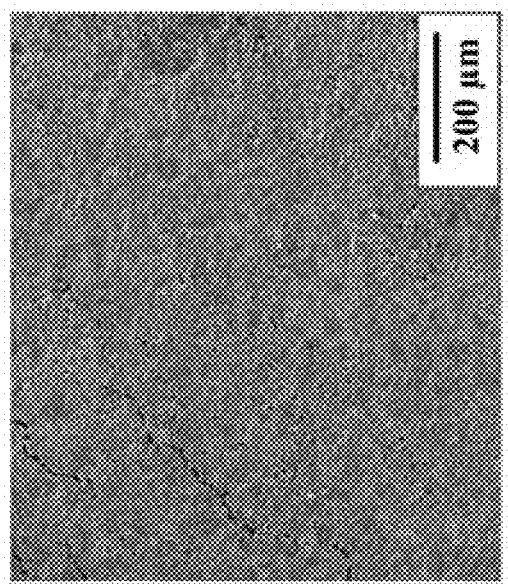
Figure 17A:
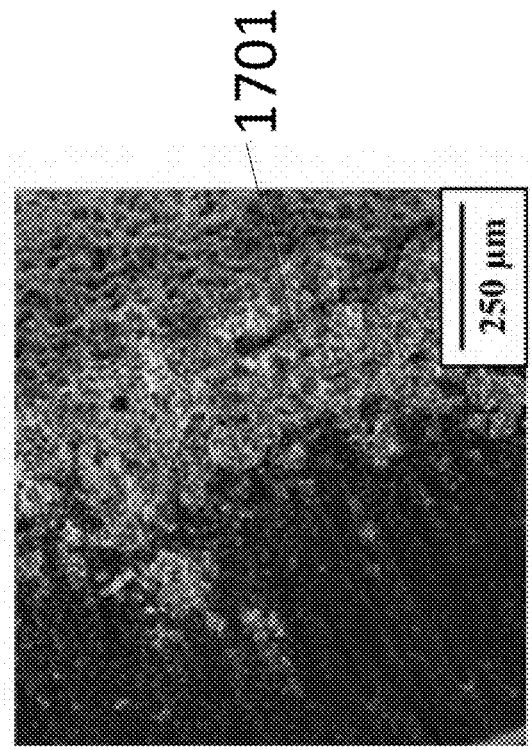
FIGS. 17A-17D show cross-sectional SEM images and elemental mappings of lithium anodes after cycling with sulfur cathodes with and without the RSL. Li—S cells were assembled with CNTs (1) RSL for FIGS. 17A and 17B and CNTs/V$_2$O$_5$ RSL for FIGS. 17C and 17D. Yellow color represents the distribution of sulfur species, according to one embodiment of the invention.
Figure 17B:
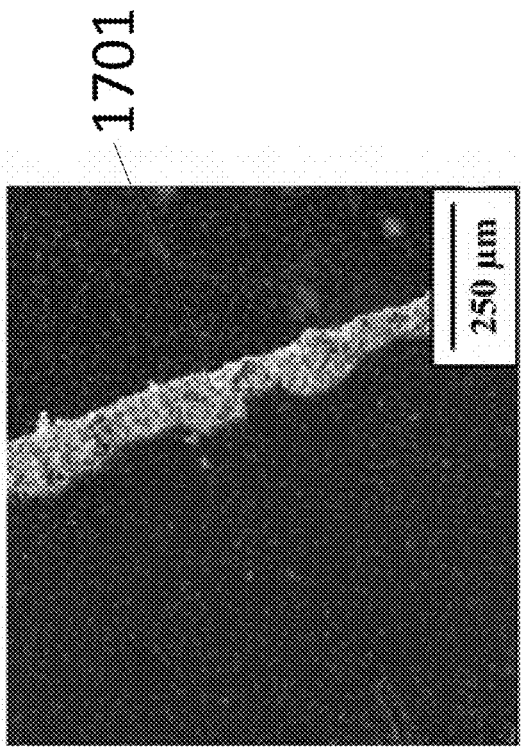
Figure 17C:
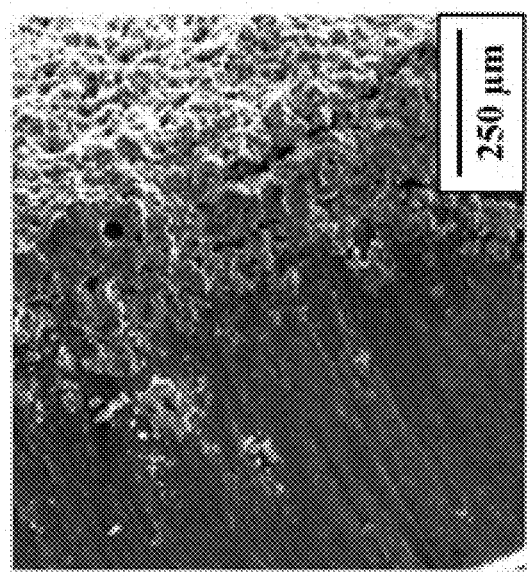
Figure 17D:
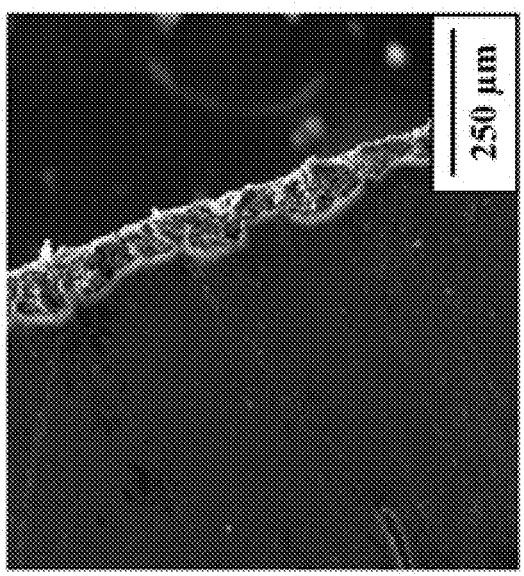

FIGS. 16A-16D show SEM images of a lithium surface after cycling at 1 C for 50 cycles FIG. 16(A) and FIG. 16(B) Li—S cell with CNTs (1) RSL, FIG. 16(C) and FIG. 16(D) Li—S cell with CNTs/$V_2O_5$ RSL.

FIGS. 17A-17D show cross-sectional SEM images and elemental mappings of lithium anodes after cycling with sulfur cathodes with and without the RSL. Li—S cells were assembled with FIGS. 17A-17B CNTs (1) RSL and FIGS. 17C-17D CNTs/$V_2O_5$ RSL. Yellow color 1701 represents the distribution of sulfur species.

FIG. 18 shows electron transfer directions regarding the relative positions of conduction bands and valence bands of the oxides and redox potential of the molecule.

FIG. 19 shows the interaction in physisorption and chemisorption. For physisorption, the electric field generated by an oxide is proportional to its surface potential [49]; for chemisorption, the bond energy between an oxide and adsorbed species is related to the dissociation energy, electronegativity and chemical hardness of the both, and can be calculated with Flore's equation [51].

FIG. 20 shows XRD plots of CNTs/oxide composites used in the RSL. The composites include, but are not limited to, $Fe_2O_3$, CuO, $MnO_2$, $MoO_3$, $V_2O_5$ and $WO_3$.

Figure 21:
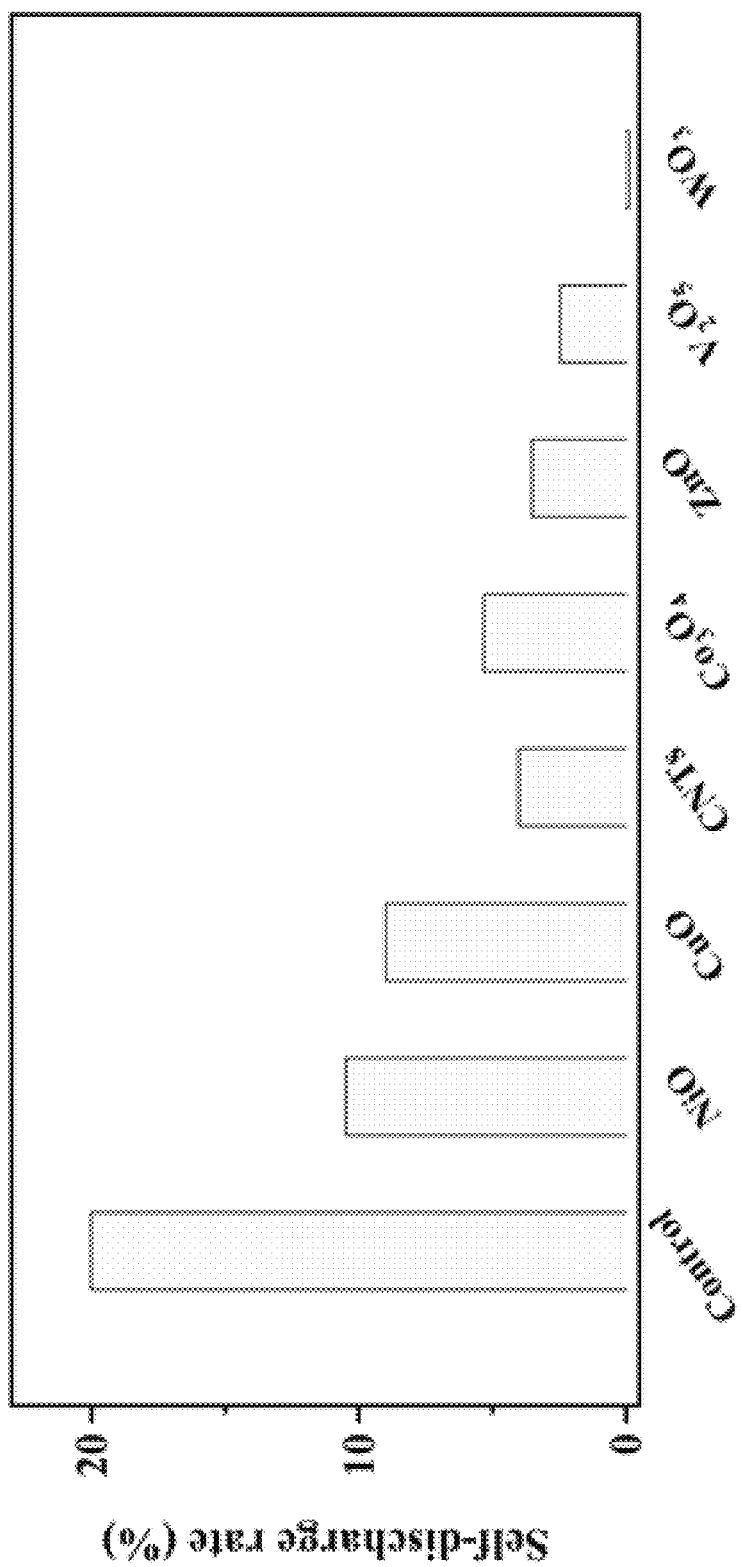
FIG. 21 shows a self-discharge rate of Li—S cells with different CNTs/oxide RSL, according to one embodiment of the invention.

FIG. 21 shows a self-discharge rate of Li—S cells with different CNTs/oxide RSL. In FIG. 21, the self-discharge rate of the $Li_2S_6$ solution (control) is around 20%. The self-discharge rates of NiO, CuO, $Co_3O_4$, CNTs, ZnO, $V_2O_5$ and $WO_3$ becomes smaller and smaller. The exact self-discharge rate (%) for each and every above-mentioned component can be scaled according to FIG. 21.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above and claims set forth below are only intended to illustrate the principles of the present invention and are not intended to limit the scope of the invention to the disclosed elements.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1] Manthiram, A.; Fu, Y.; Chung, S.-H.; Zu, C.; Su, Y.-S. Rechargeable Lithium-Sulfur Batteries. *Chem. Rev.* 2014, 114, 11751-11787.

[2] Yang, Y.; Zheng, G.; Cui, Y. Nanostructured Sulfur Cathodes. *Chem. Soc. Rev.* 2013, 42, 3018-3032.

[3] Mikhaylik, Y. V.; Akridge, J. R. Polysulfide Shuttle Study in the Li/S Battery System. *J. Electrochem. Soc.* 2004, 151, A1969.

[4] Ji, X.; Lee, K. T.; Nazar, L. F. A Highly Ordered Nanostructured Carbon-Sulphur Cathode for Lithium-Sulphur Batteries. *Nat. Mater.* 2009, 8, 500-506.

[5] Elazari, R.; Salitra, G.; Garsuch, A.; Panchenko, A.; Aurbach, D. Sulfur-Impregnated Activated Carbon Fiber Cloth as a Binder-Free Cathode for Rechargeable Li—S Batteries. *Adv. Mater.* 2011, 23, 5641-5644.

[6] Zhou, G.; Pack, E.; Hwang, G. S.; Manthiram, A. Long-Life Li/polysulphide Batteries with High Sulphur Loading Enabled by Lightweight Three-Dimensional Nitrogen/sulphur-Codoped Graphene Sponge. *Nat. Commun.* 2015, 6, 7760.

[7] Ji, X.; Evers, S.; Black, R.; Nazar, L. F. Stabilizing Lithium-Sulphur Cathodes Using Polysulphide Reservoirs. *Nat. Commun.* 2011, 2, 325.

[8] Wei Seh, Z.; Li, W.; Cha, J. J.; Zheng, G.; Yang, Y.; McDowell, M. T.; Hsu, P.-C.; Cui, Y. Sulphur-TiO2 Yolk-Shell Nanoarchitecture with Internal Void Space for Long-Cycle Lithium-Sulphur Batteries. *Nat. Commun.* 2013, 4, 1331.

[9] Chung, W. J.; Griebel, J. J.; Kim, E. T.; Yoon, H.; Simmonds, A. G.; Ji, H. J.; Dirlam, P. T.; Glass, R. S.; Wie, J. J.; Nguyen, N. A.; et al. The Use of Elemental Sulfur as an Alternative Feedstock for Polymeric Materials. *Nat. Chem.* 2013, 5, 518-524.

[10] Ma, L.; Zhuang, H. L.; Wei, S.; Hendrickson, K. E.; Kim, M. S.; Cohn, G.; Hennig, R. G.; Archer, L. A. Enhanced Li—S Batteries Using Amine-Functionalized Carbon Nanotubes in the Cathode. *ACS Nano* 2016, 10, 1050-1059.

[11] Yan, N.; Yang, X.; Zhou, W.; Zhang, H.; Li, X.; Zhang, H. Fabrication of a Nano-Li-Channel Interlayer for High Performance Li—S Battery Application. *RSC Adv.* 2015, 5, 26273-26280.

[12] Huang, J.-Q.; Zhang, Q.; Peng, H.-J.; Liu, X.-Y.; Qian, W.-Z.; Wei, F. Ionic Shield for Polysulfides towards Highly-Stable Lithium-sulfur Batteries. *Energy Environ. Sci.* 2014, 7, 347-353.

[13] Jin, Z.; Xie, K.; Hong, X. Electrochemical Performance of Lithium/sulfur Batteries Using Perfluorinated Ionomer Electrolyte with Lithium Sulfonyl Dicyanomethide Functional Groups as Functional Separator. *RSC Adv.* 2013, 3, 8889.

[14] Li, W.; Hicks-Garner, J.; Wang, J.; Liu, J.; Gross, A. F.; Sherman, E.; Graetz, J.; Vajo, J. J.; Liu, P. $V_2O_5$ Polysulfide Anion Barrier for Long-Lived Li—S Batteries. *Chem. Mater.* 2014, 26, 3403-3410.

[15] Su, Y.-S.; Manthiram, A. A New Approach to Improve Cycle Performance of Rechargeable Lithium-Sulfur Batteries by Inserting a Free-Standing MWCNT Interlayer. *Chem. Commun.* 2012, 48, 8817-8819.

[16] Chung, S.-H.; Manthiram, A. High-Performance Li—S Batteries with an Ultra-Lightweight MWCNT-Coated Separator. *J. Phys. Chem. Lett.* 2014, 5, 1978-1983.

[17] Wang, G.; Lai, Y.; Zhang, Z.; Li, J.; Zhang, Z. Enhanced Rate Capability and Cycle Stability of Lithium-sulfur Batteries with a Bifunctional MCNT@PEG-Modified Separator. *J. Mater. Chem. A* 2015, 3, 7139-7144.

[18] Kim, H. M.; Hwang, J.-Y.; Manthiram, A.; Sun, Y.-K. High-Performance Lithium-Sulfur Batteries with a Self-Assembled Multiwall Carbon Nanotube Interlayer and a Robust Electrode-Electrolyte Interface. *ACS Appl. Mater. Interfaces* 2016, 8, 983-987.

[19] Chang, C.-H.; Chung, S.-H.; Manthiram, A. Effective Stabilization of a High-Loading Sulfur Cathode and a Lithium-Metal Anode in Li—S Batteries Utilizing SWCNT-Modulated Separators. *Small* 2016, 12, 174-179.

[20] Kim, M. S.; Ma, L.; Choudhury, S.; Archer, L. A. Multifunctional Separator Coatings for High-Performance Lithium-Sulfur Batteries. *Adv. Mater. Interfaces* 2016, 3, 1600450.

[21] Vizintin, A.; Lozinšek, M.; Chellappan, R. K.; Foix, D.; Krajnc, A.; Mali, G.; Drazic, G.; Genorio, B.; Dedryvère, R.; Dominko, R. Fluorinated Reduced Graphene Oxide as an Interlayer in Li—S Batteries. *Chem. Mater.* 2015, 27, 7070-7081.

[22] Huang, J.-Q.; Zhuang, T.-Z.; Zhang, Q.; Peng, H.-J.; Chen, C.-M.; Wei, F. Permselective Graphene Oxide Membrane for Highly Stable and Anti-Self-Discharge Lithium-Sulfur Batteries. *ACS Nano* 2015, 9, 3002-3011.

[23] Zu, C.; Su, Y.-S.; Fu, Y.; Manthiram, A. Improved Lithium-Sulfur Cells with a Treated Carbon Paper Interlayer. *Phys. Chem. Chem. Phys.* 2013, 15, 2291-2297.

[24] Yao, H.; Yan, K.; Li, W.; Zheng, G.; Kong, D.; Seh, Z. W.; Narasimhan, V. K.; Liang, Z.; Cui, Y. Improved Lithium-sulfur Batteries with a Conductive Coating on the Separator to Prevent the Accumulation of Inactive S-Related Species at the Cathode-separator Interface. *Energy Environ. Sci.* 2014, 7, 3381-3390.

[25] Chung, S.-H.; Manthiram, A. Bifunctional Separator with a Light-Weight Carbon-Coating for Dynamically and Statically Stable Lithium-Sulfur Batteries. *Adv. Funct. Mater.* 2014, 24, 5299-5306.

[26] Singhal, R.; Chung, S.-H.; Manthiram, A.; Kalra, V. A Free-Standing Carbon Nanofiber Interlayer for High-Performance Lithium-sulfur Batteries. *J. Mater. Chem. A* 2015, 3, 4530-4538.

[27] Balach, J.; Jaumann, T.; Klose, M.; Oswald, S.; Eckert, J.; Giebeler, L. Functional Mesoporous Carbon-Coated Separator for Long-Life, High-Energy Lithium-Sulfur Batteries. *Adv. Funct. Mater.* 2015, 25, 5285-5291.

[28] Chung, S.-H.; Han, P.; Singhal, R.; Kalra, V.; Manthiram, A. Electrochemically Stable Rechargeable Lithium-Sulfur Batteries with a Microporous Carbon Nanofiber Filter for Polysulfide. *Adv. Energy Mater.* 2015, 5, 1500738.

[29] Chung, S.-H.; Manthiram, A. A Polyethylene Glycol-Supported Microporous Carbon Coating as a Polysulfide Trap for Utilizing Pure Sulfur Cathodes in Lithium-Sulfur Batteries. *Adv. Mater.* 2014, 26, 7352-7357.

[30] Su, Y.-S.; Manthiram, A. Lithium-Sulphur Batteries with a Microporous Carbon Paper as a Bifunctional Interlayer. *Nat. Commun.* 2012, 3, 1166.

[31] Song, R.; Fang, R.; Wen, L.; Shi, Y.; Wang, S.; Li, F. A Trilayer Separator with Dual Function for High Performance Lithium-sulfur Batteries. *J. Power Sources* 2016, 301, 179-186.

[32] Xiao, Z.; Yang, Z.; Wang, L.; Nie, H.; Zhong, M.; Lai, Q.; Xu, X.; Zhang, L.; Huang, S. A Lightweight $TiO_2$/Graphene Interlayer, Applied as a Highly Effective Polysulfide Absorbent for Fast, Long-Life Lithium-Sulfur Batteries. *Adv. Mater.* 2015, 27, 2891-2898.

[33] Kim, M. S.; Ma, L.; Choudhury, S.; Moganty, S. S.; Wei, S.; Archer, L. A. Fabricating Multifunctional Nanoparticle Membranes by a Fast Layer-by-Layer Langmuir-Blodgett Process: Application in Lithium-sulfur Batteries. *J. Mater. Chem. A* 2016, 4, 14709-14719.

[34] Hagen, M.; Hanselmann, D.; Ahlbrecht, K.; Maça, R.; Gerber, D.; Tübke, J. Lithium-Sulfur Cells: The Gap between the State-of-the-Art and the Requirements for High Energy Battery Cells. *Adv. Energy Mater.* 2015, 5, 1401986.

[35] Li, G.; Qiu, Y.; Hou, Y.; Li, H.; Zhou, L.; Deng, H.; Zhang, Y. Synthesis of $V_2O_5$ Hierarchical Structures for Long Cycle-Life Lithium-Ion Storage. *J. Mater. Chem. A* 2015, 3, 1103-1109.

[36] Lee, J. W.; Lim, S. Y.; Jeong, H. M.; Hwang, T. H.; Kang, J. K.; Choi, J. W. Extremely Stable Cycling of Ultra-Thin $V_2O_5$ Nanowire-graphene Electrodes for Lithium Rechargeable Battery Cathodes. *Energy Environ. Sci.* 2012, 5, 9889.

[37] Chen, Z.; Qin, Y.; Weng, D.; Xiao, Q.; Peng, Y.; Wang, X.; Li, H.; Wei, F.; Lu, Y. Design and Synthesis of Hierarchical Nanowire Composites for Electrochemical Energy Storage. *Adv. Funct. Mater.* 2009, 19, 3420-3426.

[38] Petkov, V.; Trikalitis, P. N.; Bozin, E. S.; Billinge, S. J. L.; Vogt, T.; Kanatzidis, M. G. Structure of $V_2O_5 \cdot nH_2O$ Xerogel Solved by the Atomic Pair Distribution Function Technique. *J. Am. Chem. Soc.* 2002, 124, 10157-10162.

[39] Xiong, C.; Aliev, A. E.; Gnade, B.; Balkus, K. J. Fabrication of Silver Vanadium Oxide and $V_2O_5$ Nanowires for Electrochromics. *ACS Nano* 2008, 2, 293-301.

[40] Zhang, S. S. Liquid Electrolyte Lithium/sulfur Battery: Fundamental Chemistry, Problems, and Solutions. *J. Power Sources* 2013, 231, 153-162.

[41] Hart, C. J.; Cuisinier, M.; Liang, X.; Kundu, D.; Garsuch, A.; Nazar, L. F. Rational Design of Sulphur Host Materials for Li—S Batteries: Correlating Lithium Polysulphide Adsorptivity and Self-Discharge Capacity Loss. *Chem. Commun.* 2015, 51, 2308-2311.

[42] Mendialdua, J.; Casanova, R.; Barbaux, Y. XPS Studies of $V_2O_5$, $V_6O_{13}$, $VO_2$ and $V_2O_3$. *J. Electron. Spectros. Relat. Phenomena* 1995, 71, 249-261.

[43] Liang, X.; Hart, C.; Pang, Q.; Garsuch, A.; Weiss, T.; Nazar, L. F. A Highly Efficient Polysulfide Mediator for Lithium-Sulfur Batteries. *Nat. Commun.* 2015, 6, 5682.

[44] Tao, X.; Wang, J.; Ying, Z.; Cai, Q.; Zheng, G.; Gan, Y.; Huang, H.; Xia, Y.; Liang, C.; Zhang, W.; et al. Strong Sulfur Binding with Conducting Magnéli-Phase $Ti_nO_{2(n-1)}$ Nanomaterials for Improving Lithium-Sulfur Batteries. *Nano Lett.* 2014, 14, 5288-5294.

[45] Greiner, M. T.; Helander, M. G.; Tang, W.-M.; Wang, Z.-B.; Qiu, J.; Lu, Z.-H. Universal Energy-Level Alignment of Molecules on Metal Oxides. *Nat. Mater.* 2012, 11, 76-81.

[46] Xu, Y.; Schoonen, M. A. A. The Absolute Energy Positions of Conduction and Valence Bands of Selected Semiconducting Minerals. *Am. Mineral.* 2000, 85, 543-556.

[47] Matar, S. F.; Campet, G.; Subramanian, M. A. Electronic Properties of Oxides: Chemical and Theoretical Approaches. *Prog. in Solid State Chem.* 2011, 39, 70-95.

[48] Greiner, M. T.; Chai, L.; Helander, M. G.; Tang, W.-M.; Lu, Z.-H. Transition Metal Oxide Work Functions: The Influence of Cation Oxidation State and Oxygen Vacancies. *Adv. Funct. Mater.* 2012, 22, 4557-4568.

[49] Hiemenz, P. C., Rajagopalan, R. Principles of Colloid and Surface Chemistry. In *The Electrical Double Layer and Double-Layer Interactions*; Marcel Dekker, New York, 1997; pp 509-510.

[50] Dean, J. A. Lange's Handbook of Chemistry. In *Properties of Atoms, Radicals, and Bonds*; McGraw-Hill, New York, 1999; pp 599-611

[51] Masel, R. I. Principles of Adsorption and Reaction on Solid Surfaces. In *Adsorption I: The Binding of Molecules to Surfaces*; John Wiley & Sons, New Jersey, 1996; pp 138-139.

[52] Ma, Y.; Zhang, H.; Wu, B.; Wang, M.; Li, X.; Zhang, H. Lithium Sulfur Primary Battery with Super High Energy Density: Based on the Cauliflower-like Structured C/S Cathode. *Sci. Rep.* 2015, 5, 14949.

[53] Wang, X.; Wang, Z.; Chen, L. Reduced Graphene Oxide Film as a Shuttle-Inhibiting Interlayer in a Lithium-sulfur Battery. *J. Power Sources* 2013, 242, 65-69.

[54] Zhang, Y.; Miao, L.; Ning, J.; Xiao, Z.; Hao, L.; Wang, B.; Zhi, L. A Graphene-Oxide-Based Thin Coating on the Separator: An Efficient Barrier towards High-Stable Lithium-sulfur Batteries. *2D Mater.* 2015, 2, 024013.

[55] Chang, C.-H.; Chung, S.-H.; Manthiram, A. Ultra-Lightweight PANiNF/MWCNT-Functionalized Separators with Synergistic Suppression of Polysulfide Migration for Li—S Batteries with Pure Sulfur Cathodes. *J. Mater. Chem. A* 2015, 3, 18829-18834.

[56] Lin, W.; Chen, Y.; Li, P.; He, J.; Zhao, Y.; Wang, Z.; Liu, J.; Qi, F.; Zheng, B.; Zhou, J.; Xu, C.; Fu, F. Enhanced Performance of Lithium Sulfur Battery with a Reduced Graphene Oxide Coating Separator. *J. Electrochem. Soc.* 2015, 162, A1624-A1629.

[57] Lee, C.-L.; Kim, I.-D. A Hierarchical Carbon Nanotube-Loaded Glass-Filter Composite Paper Interlayer with Outstanding Electrolyte Uptake Properties for High-Performance Lithium-Sulphur Batteries. *Nanoscale* 2015, 7, 10362-10367.

What is claimed is:

1. A method of fabricating a regenerative poly sulfide-scavenging layer (RSL) of a lithium-sulfur battery having a lithium anode, a sulfur cathode, and a polypropylene separator disposed between the lithium anode and the sulfur cathode, comprising:
    synthesizing composites of metal oxide nanowires intertwined with carbon nanotubes (CNTs) using hydrothermal reaction;
    dispersing the CNTs and CNTs/metal oxide composites in ethanol by sonication;
    filtrating the CNTs and the CNTs/metal oxide composites after the dispersing through a polypropylene membrane; and
    forming a flexible triple-layered membrane to fabricate the RSL having middle layers embedded with interpenetrating metal oxide nanowires: and
    placing the flexible triple-layered membrane between the polypropylene separator and the sulfur cathode of the lithium-sulfur battery to form the RSL therein, such that during discharging of the lithium-sulfur battery, polysulfides generated from the sulfur cathode are adsorbed by or reacted with the RSL and are immobilized onto the RSL to form polysulfides-RSL complexes: and a subsequent charging process strips away the immobilized polysulfides-RSL complexes and regenerates the RSL, thereby enabling dynamic blocking of the generated polysulfides.

2. The method of claim 1, wherein the metal oxide nanowires are made from $V_2O_5$.

3. The method of claim 2, further comprising:
    entangling the CNTs from the dispersing to form CNTs networks for effective electron conduction, thereby allowing performing effecting redox reaction with CNTs/$V_2O_5$ RSL.

4. The method of claim 2, further comprising the following steps after the dispersing:
    forming a CNT suspension having a first concentration and a CNTS/V2O5 suspension having a second concentration, respectively;
    selecting a first volume of the CNT suspension and a second volume of the CNTS/V2O5 suspension; and
    filtering the first volume of the CNT suspension and the second volume of the CNTs/V2O5 suspension through the polypropylene membrane.

5. The method of claim 1, further comprising:
    drying the flexible triple-layered membrane at a first temperature for a first predetermined time; and
    punching the flexible triple-layered membrane into a round shape with a diameter.

6. The method of claim 1, wherein the synthesizing comprises:
    dispersing a first mass of ammonium metavanadate and a second mass of P123 (EO20PO70EO20) in a first volume of deionized (DI) water with a second volume of 2 molar (M) HCl to form a mixture;
    adding activated CNTs to the mixture and sonicating for a first time;
    stirring the mixture at a room temperature for a second time;
    transferring the mixture to an autoclave;
    heating the mixture at a second temperature for a second predetermined time;
    rinsing the mixture with the DI water and ethanol for three times; and
    drying the mixture at a third temperature in vacuum.

7. The method of claim 1, wherein the weight of the RSL on each separator is around 0.4-0.6 mg $cm^{-2}$.

* * * * *